US010462812B2

(12) United States Patent
Damnjanovic et al.

(10) Patent No.: US 10,462,812 B2
(45) Date of Patent: Oct. 29, 2019

(54) TRANSMISSION SCHEDULING FOR CONTENTION BASED CARRIER

(71) Applicant: QUALCOMM Incorporated, San Diego, CA (US)

(72) Inventors: Aleksandar Damnjanovic, Del Mar, CA (US); Tao Luo, San Diego, CA (US); Srinivas Yerramalli, San Diego, CA (US); Peter Gaal, San Diego, CA (US); Hao Xu, Beijing (CN); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/955,471

(22) Filed: Apr. 17, 2018

(65) Prior Publication Data

US 2018/0235000 A1    Aug. 16, 2018

Related U.S. Application Data

(62) Division of application No. 15/072,104, filed on Mar. 16, 2016.

(Continued)

(51) Int. Cl.
*H04W 72/12* (2009.01)
*H04W 72/04* (2009.01)
(Continued)

(52) U.S. Cl.
CPC ....... *H04W 72/1294* (2013.01); *H04W 72/04* (2013.01); *H04W 72/1284* (2013.01);
(Continued)

(58) Field of Classification Search
CPC ......... H04W 72/1294; H04W 72/1284; H04W 74/006; H04W 72/04; H04W 72/12; H04W 74/08

See application file for complete search history.

(56) References Cited

U.S. PATENT DOCUMENTS 5,428,819 A    6/1995 Wang et al.
6,192,248 B1    2/2001 Solondz
(Continued)

FOREIGN PATENT DOCUMENTS

EP    1489758 A1    12/2004
EP    1738539 B1    12/2014
(Continued)

OTHER PUBLICATIONS

International Search Report and Written Opinion—PCT/US2016/026220—ISA/EPO—dated Aug. 30, 2016.
(Continued)

*Primary Examiner* — Mounir Moutaouakil
(74) *Attorney, Agent, or Firm* — Nerrie M. Zohn

(57) ABSTRACT

A method, an apparatus, and a computer program product for wireless communication are provided. A base station transmits a provisional grant uplink assignment to a set of UEs. When a UE receives the provisional grant uplink assignment, the UE performs a clear channel assessment (CCA) operation on a secondary component carrier (SCC) based on the provisional grant UL assignment, the SCC being a contention-based carrier. Then, the UE transmits a schedule request (SR) on the SCC when the CCA operation succeeds. The base station transmits grant confirmation(s) on the SCC in response to the detected SR(s). Once the UE receives a grant confirmation on the SCC in response to the SR, the UE transmits data on the SCC.

20 Claims, 23 Drawing Sheets

Related U.S. Application Data

(60) Provisional application No. 62/144,800, filed on Apr. 8, 2015, provisional application No. 62/146,085, filed on Apr. 10, 2015.

(51) Int. Cl.
  *H04W 74/00*    (2009.01)
  *H04W 74/08*    (2009.01)

(52) U.S. Cl.
  CPC .......... *H04W 74/006* (2013.01); *H04W 72/12* (2013.01); *H04W 74/08* (2013.01)

(56) References Cited

U.S. PATENT DOCUMENTS

| | | |
|---|---|---|
| 8,989,213 B2 | 3/2015 | Wentink |
| 9,907,083 B2 | 2/2018 | Ma et al. |
| 2003/0016647 A1 | 1/2003 | Margon |
| 2003/0048799 A1 | 3/2003 | Jang |
| 2003/0214933 A1 | 11/2003 | Margon |
| 2007/0086419 A1 | 4/2007 | Jang et al. |
| 2009/0238122 A1* | 9/2009 | Vukovic ........... H04W 72/0493 370/329 |
| 2010/0111107 A1 | 5/2010 | Han et al. |
| 2010/0278156 A1 | 11/2010 | Shin et al. |
| 2011/0044278 A1 | 2/2011 | Astely et al. |
| 2011/0044298 A1 | 2/2011 | Wentink et al. |
| 2011/0141969 A1 | 6/2011 | Sridhara et al. |
| 2012/0044816 A1 | 2/2012 | Ratasuk et al. |
| 2012/0063302 A1 | 3/2012 | Damnjanovic et al. |
| 2012/0188961 A1 | 7/2012 | Suzuki et al. |
| 2013/0242824 A1* | 9/2013 | Lee ...................... H04L 1/1819 370/281 |
| 2015/0055506 A1 | 2/2015 | Birlik et al. |
| 2015/0139175 A1* | 5/2015 | Ratasuk ................ H04L 5/0051 370/330 |
| 2015/0245246 A1 | 8/2015 | Golitschek Edler Von Elbwart et al. |
| 2015/0334656 A1 | 11/2015 | Ji et al. |
| 2016/0072613 A1* | 3/2016 | Esserman ............ H04L 5/0037 370/230 |
| 2016/0073344 A1 | 3/2016 | Vutukuri et al. |
| 2016/0157256 A1* | 6/2016 | Tseng ................ H04W 72/1284 370/329 |
| 2016/0227527 A1* | 8/2016 | Fujishiro ................ H04W 16/32 |
| 2016/0302225 A1 | 10/2016 | Damnjanovic et al. |
| 2016/0337968 A1 | 11/2016 | Park et al. |
| 2017/0055311 A1* | 2/2017 | Van Phan ............. H04W 76/23 |
| 2017/0079032 A1 | 3/2017 | Li et al. |
| 2017/0288928 A1* | 10/2017 | Xu ...................... H04L 27/2627 |
| 2017/0366308 A1* | 12/2017 | Choi ..................... H04L 1/1887 |
| 2018/0006775 A1* | 1/2018 | Li ............................ H04L 5/001 |
| 2018/0063866 A1* | 3/2018 | Bertrand ............... H04L 5/0051 |

FOREIGN PATENT DOCUMENTS

| | | |
|---|---|---|
| EP | 2840863 A2 | 2/2015 |
| GB | 2516131 A | 1/2015 |
| WO | 9700590 A1 | 1/1997 |
| WO | 2012037284 A1 | 3/2012 |
| WO | 2014159718 A1 | 10/2014 |

OTHER PUBLICATIONS

Partial International Search Report—PCT/US2016/026220—ISA/EPO—dated Jun. 24, 2016.

* cited by examiner

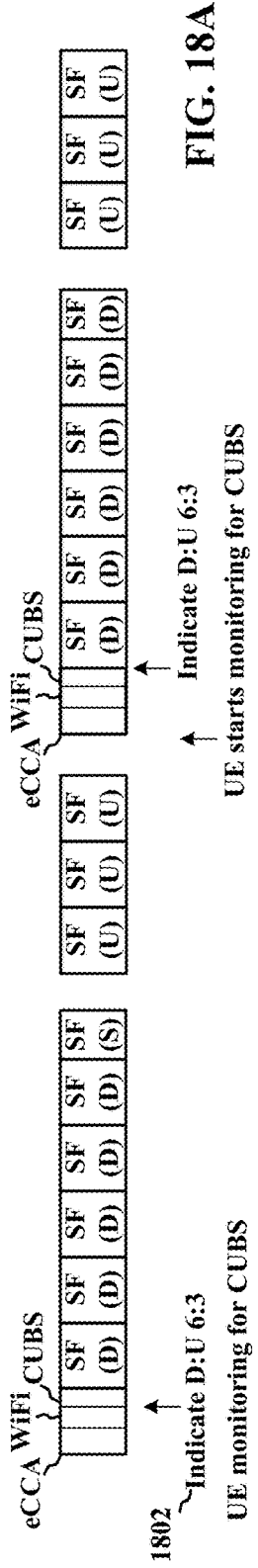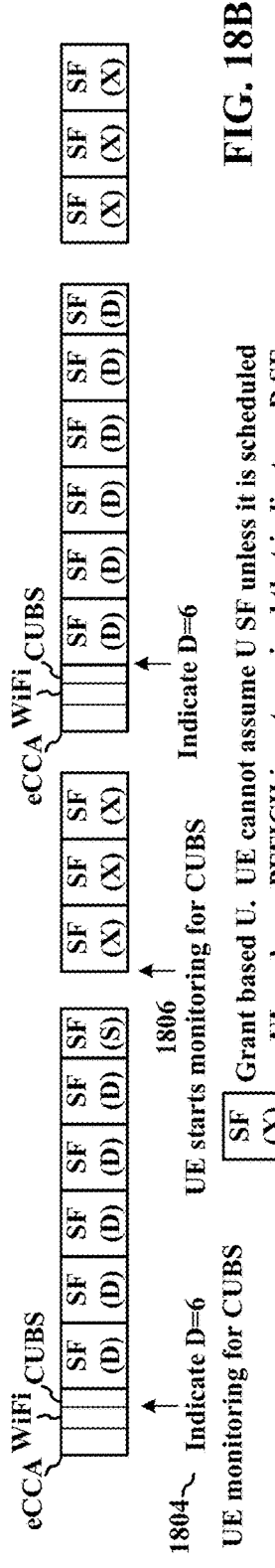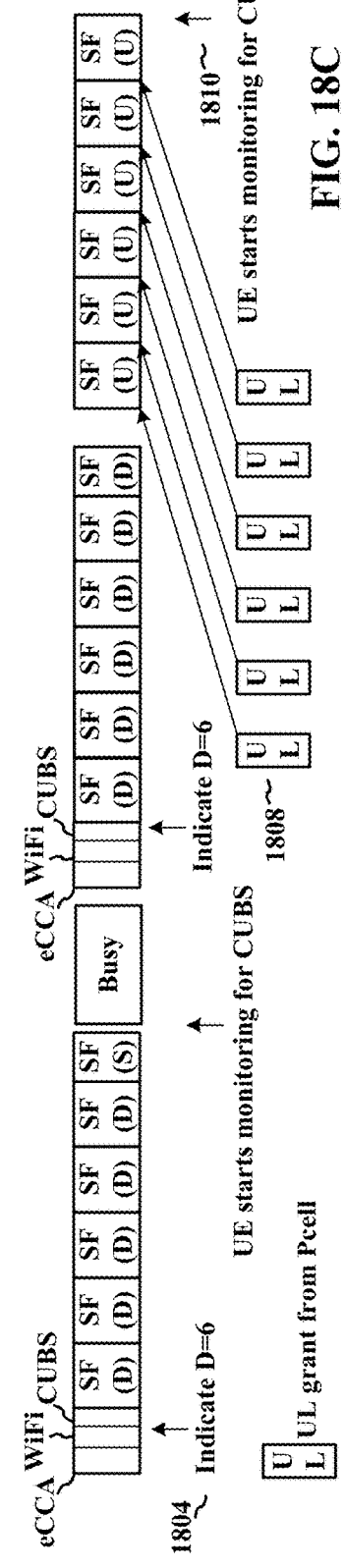

TRANSMISSION SCHEDULING FOR CONTENTION BASED CARRIER

CROSS-REFERENCE TO RELATED APPLICATIONS

This application is a divisional of U.S. patent application Ser. No. 15/072,104, entitled "UPLINK TRANSMISSION SCHEDULING FOR CONTENTION BASED CARRIER" and filed on Mar. 16, 2016, which claims the benefit of U.S. Provisional Application Ser. No. 62/144,800, entitled "UPLINK TRANSMISSION SCHEDULING FOR CONTENTION BASED CARRIER" and filed on Apr. 8, 2015, and U.S. Provisional Application Ser. No. 62/146,085 entitled "TECHNIQUES FOR INDICATING DOWNLINK SUBFRAMES AND UPLINK SUBFRAMES" and filed on Apr. 10, 2015, the entire contents of both of which are expressly incorporated by reference herein in its entirety.

BACKGROUND

Field

Aspects of the present disclosure relate generally to wireless communication systems, and more particularly, to downlink or uplink transmission control with clear channel assessment in wireless communication networks with contention-based shared frequency spectrum.

Background

Wireless communication systems are widely deployed to provide various types of communication content, such as voice, video, packet data, messaging, broadcast, or the like. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, single-carrier frequency-division multiple access (SC-FDMA) systems, and orthogonal frequency-division multiple access (OFDMA) systems.

By way of example, a wireless multiple-access communication system may include a number of base stations, each simultaneously supporting communication for multiple communication devices, otherwise known as user equipment (UEs). A base station may communicate with UEs on downlink channels (e.g., for transmissions from a base station to a UE) and uplink channels (e.g., for transmissions from a UE to a base station).

Some modes of communication may enable communications between a base station and a UE over a contention-based shared radio frequency spectrum band, or over different radio frequency spectrum bands (e.g., a licensed radio frequency spectrum band or an unlicensed radio frequency spectrum band) of a cellular network. With increasing data traffic in cellular networks that use a licensed radio frequency spectrum band, offloading of at least some data traffic to an unlicensed radio frequency spectrum band may provide a cellular operator with opportunities for enhanced data transmission capacity. An unlicensed radio frequency spectrum band may also provide service in areas where access to a licensed radio frequency spectrum band is unavailable.

Prior to gaining access to, and communicating over, a contention-based shared radio frequency spectrum band, a base station or UE may perform a listen before talk (LBT) procedure to contend for access to the shared radio frequency spectrum band. An LBT procedure may include performing a clear channel assessment (CCA) or extended CCA (eCCA) procedure to determine whether a channel of the contention-based shared radio frequency spectrum band is available. When it is determined that the channel of the contention-based shared radio frequency spectrum band is available, a channel reserving signal, such as a channel usage beacon signal (CUBS) may be transmitted to reserve the channel.

When operating on a shared radio frequency spectrum, a base station operating in a time domain duplexing (TDD) mode may indicate to other nodes, prior to or at the beginning of a frame of communications over the shared radio frequency spectrum, a TDD structure of the frame of communications. In some cases, the TDD structure may be signaled on a physical frame format indicator channel (PFFICH) and may include an indication of a downlink/uplink subframe split (or an indication of a subframe boundary at which the direction of communication switches from a downlink (DL) transmission (e.g., a transmission of DL subframes) to an uplink (UL) transmission (e.g., a transmission of UL subframes)).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects presented herein may allow a base station to separately signal the beginning of a DL transmission period. In some cases, this may give the base station more time to determine whether an UL transmission period should be scheduled, or how many UL subframes should be included in the UL transmission period. The base station may also signal a number of UL subframes associated with an upcoming (or subsequent) UL transmission period.

Various aspects disclosed herein provide for mechanisms by which an eNodeB (eNB) can more reliably allocate spectrum to different UEs in a contention-based carrier environment. Certain aspects relate to a technique by which a UE can receive a grant confirming allocation of resources for an UL transmission on the contention-based spectrum after capturing the spectrum. Other aspects relate to a flexible frame structure capable of accommodating a flexible ratio of DL:UL subframes by only indicating a DL portion of a frame to UEs prior to a DL transmission, while supporting an arbitrary series subsequent UL subframes.

When transmitting in LTE using LAA and unlicensed-only spectrum, a node must perform a CCA/eCCA before the transmission. For uplink transmissions, a UE may not transmit until it is scheduled. Therefore, in order to schedule the UE for UL transmission, an eNB must capture the medium, by performing a CCA/eCCA procedure, in order to transmit the scheduling information to the UE. After receiving the scheduling information, the UE also needs to capture the medium, by performing a CCA/eCCA procedure, in order transmit data.

For UL heavy configurations, the standard frame based communication structure may be insufficient. First, the eNB may have difficulty capturing the medium in the presence of a large number of WiFi nodes. Furthermore, interference conditions at the UEs are unclear, therefore each scheduled UE's ability to perform a successful individual CCA/eCCA to capture the medium at the scheduled resource, after being scheduled, is precarious and unknown. Finally, the rate at which UEs capture the medium may not lead to fair usage of the medium.

In an aspect of the disclosure, a method, a computer program product, and an apparatus are provided. The apparatus receives an indicator for a DL transmission period. The apparatus may receive a frame format indicator for a frame at a UE, wherein the frame indicator identifies only a plurality of DL subframes scheduled for a contention-based carrier and receives a DL portion of the frame. The apparatus may receive an UL grant at the UE for the contention based carrier prior to the end of the DL subframes, wherein the UL grant identifies at least one UL resource assigned to the UE, the at least one UL resource being in at least one UL subframe. The apparatus may then transmit on the UL resources in accordance to the UL grant.

The apparatus may monitor for a downlink CUBS after the at least one UL subframe. The UL grant may be received on one of the contention-based carrier or a non-contention carrier.

The apparatus may monitor for a DL CUBS after the DL portion of the frame. For example, the apparatus may monitor for a CUBS after the DL subframes when the UE does not receive an UL grant prior to the end of the DL portion, and after at least one UL subframe of the frame when the UE receives the UL grant prior to the end of the DL subframes, wherein the UL grant identifies the at least one UL subframe.

In another aspect of the disclosure, a method, a computer program product, and an apparatus are provided. The apparatus receives a provisional grant UL assignment at a UE, performs a CCA operation on a secondary component carrier (SCC) based on the provisional grant UL assignment, the SCC being a contention-based carrier, and transmits a scheduling request (SR) on the SCC when the CCA operation succeeds. The apparatus receives a grant confirmation on the SCC in response to the SR and transmits data on the SCC after receiving the grant confirmation.

The SR may comprise a signature sequence and the grant confirmation may comprise the same signature sequence. The grant confirmation may be spaced from the CCA operation. The provisional grant UL assignment and the grant confirmation may be received on a contention-based carrier. Alternatively, the provisional grant UL assignment may be received on a non-contention carrier.

In another aspect of the disclosure, a method, a computer program product, and an apparatus are provided. The apparatus transmits a frame format indicator for a frame, wherein the frame format indicator identifies only a plurality of DL subframes scheduled for a contention-based carrier. The apparatus also transmits a DL portion of the frame.

The apparatus may further transmit an UL grant to a UE for the contention based carrier prior to the end of the DL subframes, wherein the UL grant identifies at least one UL resource assigned to the UE, the at least one UL resource being in at least one UL subframe and may receive a data transmission on the UL resources in accordance to the UL grant. The UL grant may be transmitted on one of the contention-based carrier or a non-contention carrier.

In another aspect of the disclosure, a method, a computer program product, and an apparatus are provided. The apparatus transmits a provisional grant UL assignment to a set of UEs, the set including one or more UE and detects one or more SRs on an SCC, the SCC being a contention based carrier, in response to the one or more provisional grant UL assignment transmission. The apparatus then transmits one or more grant confirmations on the SCC in response to the detected one or more SRs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 18A, 18B, and 18C illustrate an example, configuration of UL scheduling for carrier aggregation mode in accordance with the present disclosure.

DETAILED DESCRIPTION

Figure 1:
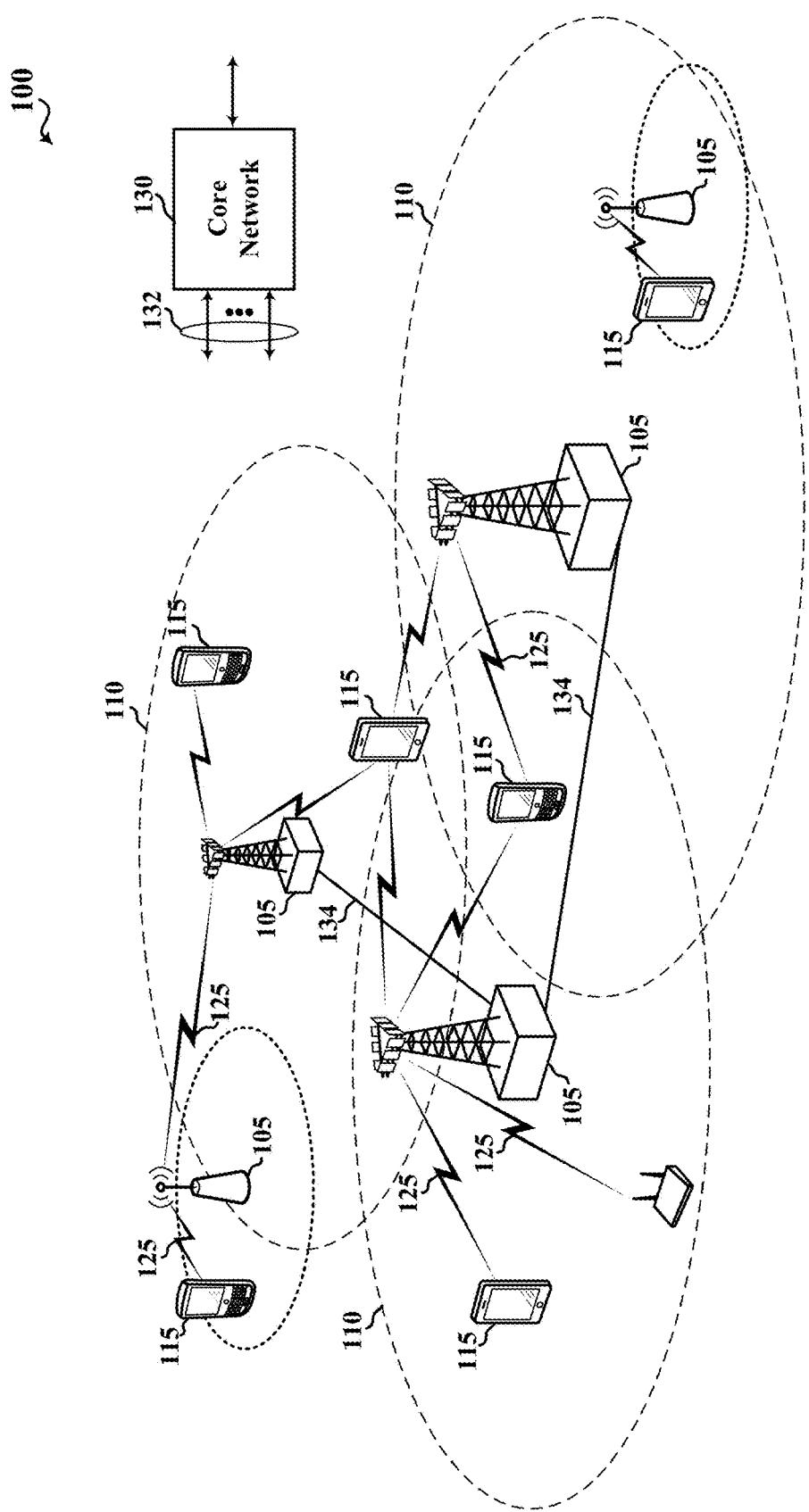
FIG. 1 shows a diagram that illustrates an example of a wireless communications system according to various aspects of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Techniques are described in which an unlicensed radio frequency spectrum band is used for at least a portion of contention-based communications over a wireless communication system. In some examples, a contention-based shared radio frequency spectrum band may be used for LTE communications or LTE-Advanced (LTE-A) communications. The contention-based radio frequency spectrum band may be used in combination with, or independent from, a non-contention licensed radio frequency spectrum band. In some examples, the contention-based radio frequency spectrum band may be a radio frequency spectrum band for which a device may also need to contend for access because the radio frequency spectrum band is available, at least in part, for unlicensed use, such as WiFi use.

With increasing data traffic in cellular networks that use a licensed radio frequency spectrum band, offloading of at least some data traffic to a contention-based shared radio frequency spectrum band, such as in an unlicensed band, may provide a cellular operator (e.g., an operator of a public land mobile network (PLMN) or a coordinated set of base stations defining a cellular network, such as an LTE/LTE-A network) with opportunities for enhanced data transmission capacity. As noted above, before communicating over a contention-based shared radio frequency spectrum band, such as unlicensed spectrum, devices may perform an LBT procedure to gain access to the shared radio frequency spectrum band. Such an LBT procedure may include performing a CCA procedure (or an eCCA procedure) to determine whether a channel of the unlicensed radio frequency spectrum band is available. When it is determined that the channel of the contention-based radio frequency spectrum band is available, a channel reserving signal (e.g., a CUBS) may be transmitted to reserve the channel. When it is determined that a channel is not available, a CCA procedure (or eCCA procedure) may be performed for the channel again at a later time.

When a base station and/or a UE includes multiple antenna ports capable of transmitting over the contention-based shared radio frequency spectrum band, transmissions from different antenna ports may interfere with one another due to correlation between transmitted signals. For a channel reserving signal used to reserve a channel of a contention-based shared radio frequency spectrum band, reduction of interference due to correlation between transmitted signals may be important to provide good detection capabilities for reserving the channel, and to prevent false detection that would unnecessarily reserve the channel and prevent other devices from using the channel. To reduce such interference due to cross-correlation of signals from different antennas or auto-correlation of a signal from a single antenna, the base station or the UE may generate a sequence based at least in part on an antenna port identifier associated with an antenna port that transmits the sequence of the channel reserving signal. In this way, correlation of channel reserving signals may be reduced, thereby improving detection capabilities of the signal transmission, resulting in more effective and accurate reservations of a channel of the contention-based shared radio frequency spectrum band.

In other words, for a channel reserving signal used to reserve a channel of an unlicensed radio frequency spectrum band, the channel reserving signal should be configured with good detectability to reduce false alarms, so that the channel reservation may be easily detected by other devices trying to access the shared radio frequency spectrum band. Thus, the channel reserving signal sequence should have good auto-correlation properties and good cross-correlation properties with sequences from neighbor base stations. For example, a primary synchronization signal (PSS), a secondary synchronization signal (SSS), and/or a channel state information-reference signal (CSI-RS) may not have good auto-correlation properties or good cross-correlation properties between different base stations in the contention-based shared radio frequency spectrum band. Thus, the channel reserving signal sequence should be configured based at least in part on an antenna port identifier to provide good auto-correlation and cross-correlation properties.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 is an illustration of an example wireless communication system 100, in accordance with various aspects of the present disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., Si, etc.) and may perform radio configuration and scheduling for communication with the UEs 115, or may operate under the control of a base station controller (not shown). In various examples, the base stations 105 may communicate, either directly or indirectly (e.g., through core network 130), with other base stations 105 over backhaul links 134 (e.g., X2, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNB, a Home NodeB, a Home eNB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network. In LTE/LTE-A networks, the term eNB may be used to describe the base stations 105, while the term UE may be used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, unlicensed, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include DL transmissions, from a base station 105 to a UE 115, or UL transmissions from a UE 115 to a base station 105. The downlink transmissions may also be called forward link transmissions, while the uplink transmissions may also be called reverse link transmissions. In some examples, UL transmissions may include transmissions of uplink control information, which uplink control information may be transmitted over an uplink control channel (e.g., a physical uplink control channel (PUCCH) or enhanced PUCCH (ePUCCH)). The uplink control information may include, for example, acknowledgements or non-acknowledgements of downlink transmissions, or channel state information. Uplink transmissions may also include transmissions of data, which data may be transmitted over a physical uplink shared channel (PUSCH) or enhanced PUSCH (ePUSCH). Uplink transmissions may also include the transmission of a sounding reference signal (SRS) or enhanced SRS (eSRS), a physical random access channel (PRACH) or enhanced PRACH (ePRACH) (e.g., in a dual connectivity mode or the standalone mode described with reference to FIGS. 2A and 2B), or an SR or enhanced SR (eSR) (e.g., in the standalone mode described with reference to FIGS. 2A and 2B). References in this disclosure to a PUCCH, a PUSCH, a PRACH, an SRS, or an SR are presumed to inherently include references to a respective ePUCCH, ePUSCH, ePRACH, eSRS, or eSR.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some aspects of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

The wireless communication system 100 may also or alternatively support operation over a non-contention licensed radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) or a contention-based shared radio frequency spectrum band (e.g., an unlicensed radio frequency spectrum band for which transmitting apparatuses may need to contend for access because the radio frequency spectrum band is available for unlicensed use, such as WiFi use). Upon winning a contention for access to the contention-based shared radio frequency spectrum band, a transmitting apparatus (e.g., a base station 105 or UE 115) may transmit one or more channel reserving signals (e.g., one or more CUBS) over the unlicensed radio frequency spectrum band. The channel reserving signals may serve to reserve the unlicensed radio frequency spectrum by providing a detectable energy on the unlicensed radio frequency spectrum band. The channel reserving signals may also serve to identify a transmitting apparatus and/or a transmitting antenna, or may serve to synchronize the transmitting apparatus and a receiving apparatus. In some examples, a channel reserving signal transmission may commence at a symbol period boundary (e.g., an OFDM symbol period boundary). In other examples, a CUBS transmission may commence between symbol period boundaries.

The number and arrangement of components shown in FIG. 1 are provided as an example. In practice, wireless communication system 100 may include additional devices, fewer devices, different devices, or differently arranged devices than those shown in FIG. 1. Additionally, or alternatively, a set of devices (e.g., one or more devices) of wireless communication system 100 may perform one or more functions described as being performed by another set of devices of wireless communication system 100.

Figure 2A:
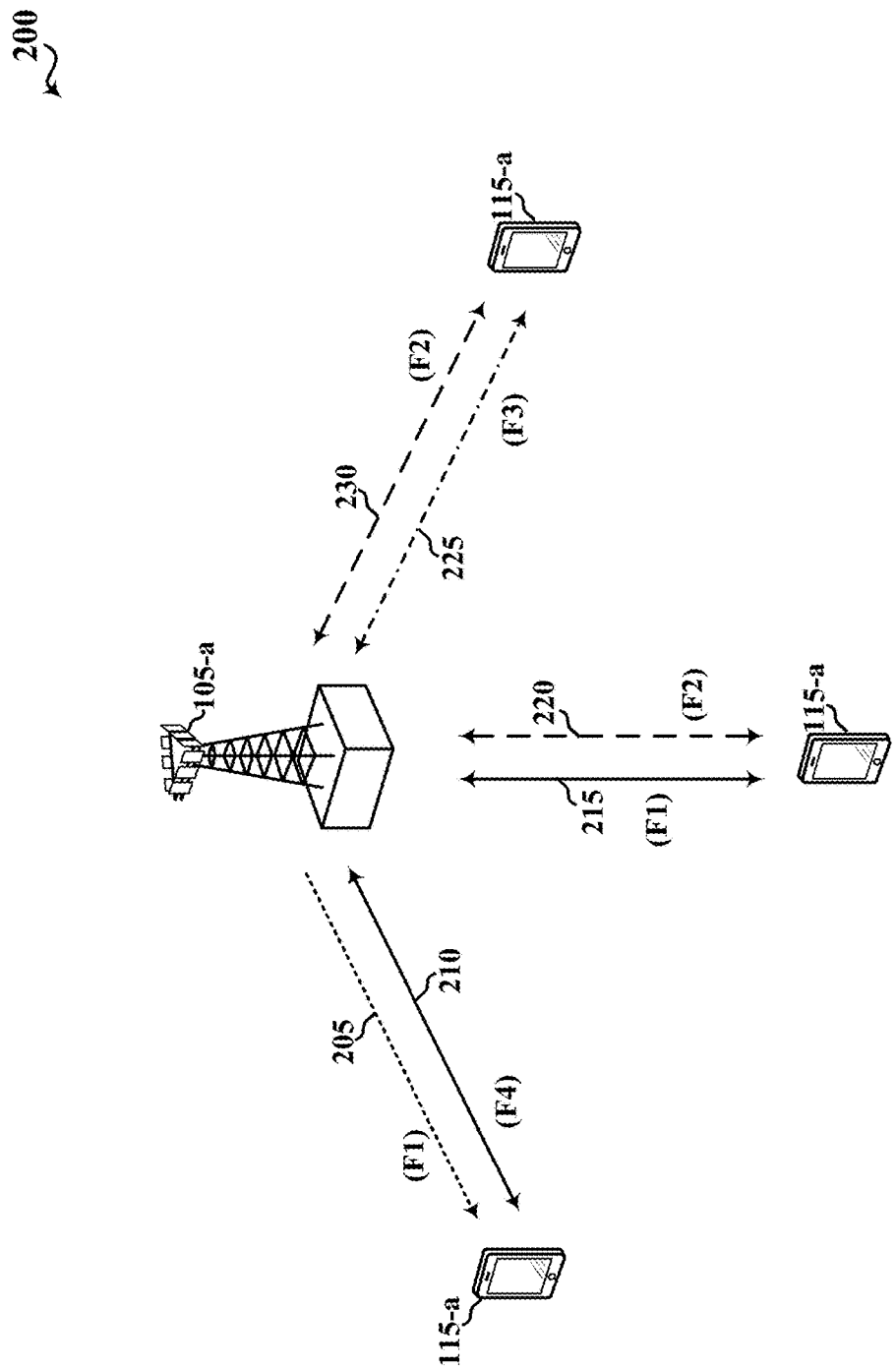
FIG. 2A shows a diagram that illustrates examples of deployment scenarios for using LTE in an unlicensed spectrum according to various aspects of the present disclosure.

Turning next to FIG. 2A, a diagram 200 shows examples of a supplemental downlink mode (e.g., licensed assisted access (LAA) mode) and of a carrier aggregation mode for an LTE network that supports LTE/LTE-A extended to contention-based shared spectrum. The diagram 200 may be an example of portions of the system 100 of FIG. 1. Moreover, the base station 105-a may be an example of the base stations 105 of FIG. 1, while the UEs 115-a may be examples of the UEs 115 of FIG. 1.

In the example of a supplemental downlink mode (e.g., LAA mode) in diagram 200, the base station 105-a may transmit OFDMA communications signals to a UE 115-a using a downlink 205. The downlink 205 is associated with a frequency F1 in an unlicensed spectrum. The base station 105-a may transmit OFDMA communications signals to the same UE 115-a using a bidirectional link 210 and may receive SC-FDMA communications signals from that UE 115-a using the bidirectional link 210. The bidirectional link 210 is associated with a frequency F4 in a licensed spectrum. The downlink 205 in the unlicensed spectrum and the bidirectional link 210 in the licensed spectrum may operate concurrently. The downlink 205 may provide a downlink capacity offload for the base station 105-a. In some embodiments, the downlink 205 may be used for unicast services (e.g., addressed to one UE) services or for multicast services (e.g., addressed to several UEs). This scenario may occur with any service provider (e.g., traditional mobile network operator or MNO) that uses a licensed spectrum and needs to relieve some of the traffic and/or signaling congestion.

In one example of a carrier aggregation mode in diagram 200, the base station 105-a may transmit OFDMA communications signals to a UE 115-a using a bidirectional link 215 and may receive SC-FDMA communications signals from the same UE 115-a using the bidirectional link 215. The bidirectional link 215 is associated with the frequency F1 in the unlicensed spectrum. The base station 105-a may also transmit OFDMA communications signals to the same UE 115-a using a bidirectional link 220 and may receive SC-FDMA communications signals from the same UE 115-a using the bidirectional link 220. The bidirectional link 220 is associated with a frequency F2 in a licensed spectrum. The bidirectional link 215 may provide a downlink and uplink capacity offload for the base station 105-a. Like the supplemental downlink (e.g., LAA mode) described above, this scenario may occur with any service provider (e.g., MNO) that uses a licensed spectrum and needs to relieve some of the traffic and/or signaling congestion.

In another example of a carrier aggregation mode in diagram 200, the base station 105-a may transmit OFDMA communications signals to a UE 115-a using a bidirectional link 225 and may receive SC-FDMA communications signals from the same UE 115-a using the bidirectional link 225. The bidirectional link 225 is associated with the frequency F3 in an unlicensed spectrum. The base station 105-a may also transmit OFDMA communications signals to the same UE 115-a using a bidirectional link 230 and may receive SC-FDMA communications signals from the same UE 115-a using the bidirectional link 230. The bidirectional link 230 is associated with the frequency F2 in the licensed spectrum. The bidirectional link 225 may provide a downlink and uplink capacity offload for the base station 105-*a*. This example and those provided above are presented for illustrative purposes and there may be other similar modes of operation or deployment scenarios that combine LTE/LTE-A with or without contention-based shared spectrum for capacity offload.

As described above, the typical service provider that may benefit from the capacity offload offered by using LTE/LTE-A extended to contention-based spectrum is a traditional MNO with LTE spectrum. For these service providers, an operational configuration may include a bootstrapped mode (e.g., supplemental downlink (e.g., LAA mode), carrier aggregation) that uses the LTE PCC on the non-contention spectrum and the LTE SCC on the contention-based spectrum.

In the supplemental downlink mode, control for LTE/LTE-A extended to contention-based spectrum may be transported over the LTE uplink (e.g., uplink portion of the bidirectional link 210). One of the reasons to provide downlink capacity offload is because data demand is largely driven by downlink consumption. Moreover, in this mode, there may not be a regulatory impact since the UE is not transmitting in an unlicensed spectrum. There is no need to implement LBT or carrier sense multiple access (CSMA) requirements on the UE. However, LBT may be implemented on the base station (e.g., eNB) by, for example, using a periodic (e.g., every 10 milliseconds) CCA and/or a grab-and-relinquish mechanism aligned to a radio frame boundary.

In the CA mode, data and control may be communicated in LTE (e.g., bidirectional links 210, 220, and 230) while data may be communicated in LTE/LTE-A extended to contention-based shared spectrum (e.g., bidirectional links 215 and 225). The carrier aggregation mechanisms supported when using LTE/LTE-A extended to contention-based shared spectrum may fall under a hybrid frequency division duplexing-time division duplexing (FDD-TDD) carrier aggregation or a TDD-TDD carrier aggregation with different symmetry across component carriers.

Figure 2B:
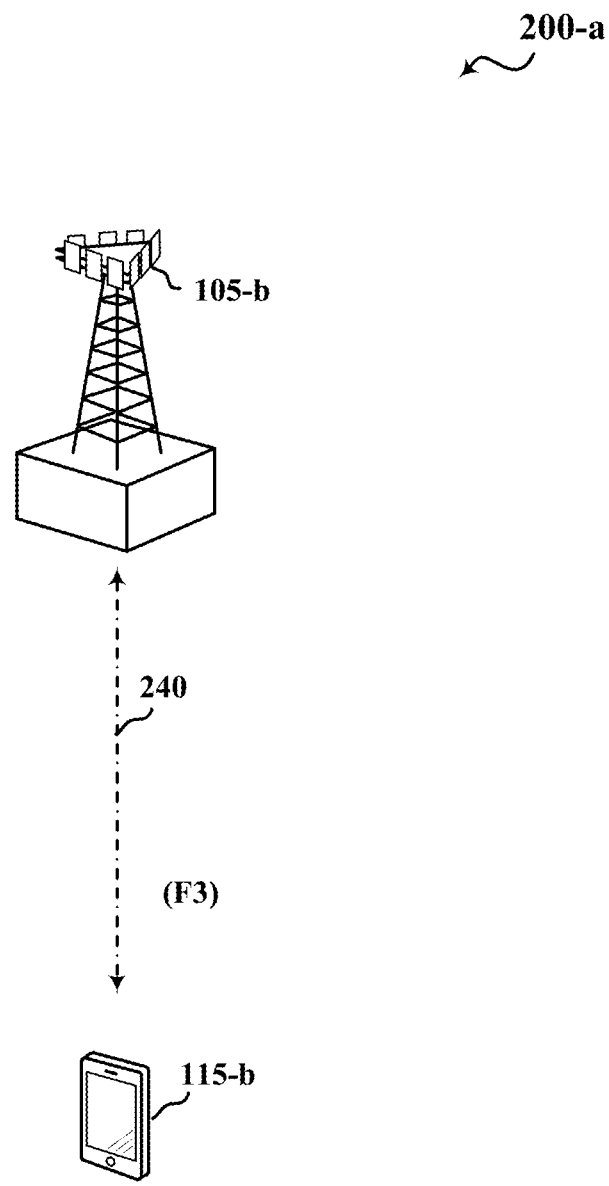
FIG. 2B shows a diagram that illustrates another example of a deployment scenario for using LTE in an unlicensed spectrum according to various aspects of the present disclosure.

FIG. 2B shows a diagram 200-*a* that illustrates an example of a standalone mode for LTE/LTE-A extended to contention-based shared spectrum. The diagram 200-*a* may be an example of portions of the system 100 of FIG. 1. Moreover, the base station 105-*b* may be an example of the base stations 105 of FIG. 1 and the base station 105-*a* of FIG. 2A, while the UE 115-*b* may be an example of the UEs 115 of FIG. 1 and the UEs 115-*a* of FIG. 2A.

In the example of a standalone mode in diagram 200-*a*, the base station 105-*b* may transmit OFDMA communications signals to the UE 115-*b* using a bidirectional link 240 and may receive SC-FDMA communications signals from the UE 115-*b* using the bidirectional link 240. The bidirectional link 240 is associated with the frequency F3 in a contention-based shared spectrum described above with reference to FIG. 2A. The standalone mode may be used in non-traditional wireless access scenarios, such as in-stadium access (e.g., unicast, multicast). An example of the typical service provider for this mode of operation may be a stadium owner, cable company, event hosts, hotels, enterprises, and large corporations that do not have licensed spectrum. For these service providers, an operational configuration for the standalone mode may use the PCC on the contention-based spectrum. Moreover, LBT may be implemented on both the base station and the UE.

In some examples, a transmitting apparatus such as one of the base stations 105, 205, or 205-*a* described with reference to FIG. 1, 2A, or 2B, or one of the UEs 115, 215, 215-*a*, 215-*b*, or 215-*c* described with reference to FIG. 1, 2A, or 2B, may use a gating interval to gain access to a channel of a contention-based shared radio frequency spectrum band (e.g., to a physical channel of an unlicensed radio frequency spectrum band). In some examples, the gating interval may be periodic. For example, the periodic gating interval may be synchronized with at least one boundary of an LTE/LTE-A radio interval. The gating interval may define the application of a contention-based protocol, such as an LBT protocol based at least in part on the LBT protocol specified in European Telecommunications Standards Institute (ETSI). When using a gating interval that defines the application of an LBT protocol, the gating interval may indicate when a transmitting apparatus needs to perform a contention procedure (e.g., an LBT procedure) such as a clear channel assessment (CCA) procedure. The outcome of the CCA procedure may indicate to the transmitting apparatus whether a channel of a contention-based shared radio frequency spectrum band is available or in use for the gating interval (also referred to as an LBT radio frame). When a CCA procedure indicates that the channel is available for a corresponding LBT radio frame (e.g., "clear" for use), the transmitting apparatus may reserve or use the channel of the contention-based shared radio frequency spectrum band during part or all of the LBT radio frame. When the CCA procedure indicates that the channel is not available (e.g., that the channel is in use or reserved by another transmitting apparatus), the transmitting apparatus may be prevented from using the channel during the LBT radio frame.

The number and arrangement of components shown in FIGS. 2A and 2B are provided as an example. In practice, wireless communication system 200 may include additional devices, fewer devices, different devices, or differently arranged devices than those shown in FIGS. 2A and 2B.

Figure 3:
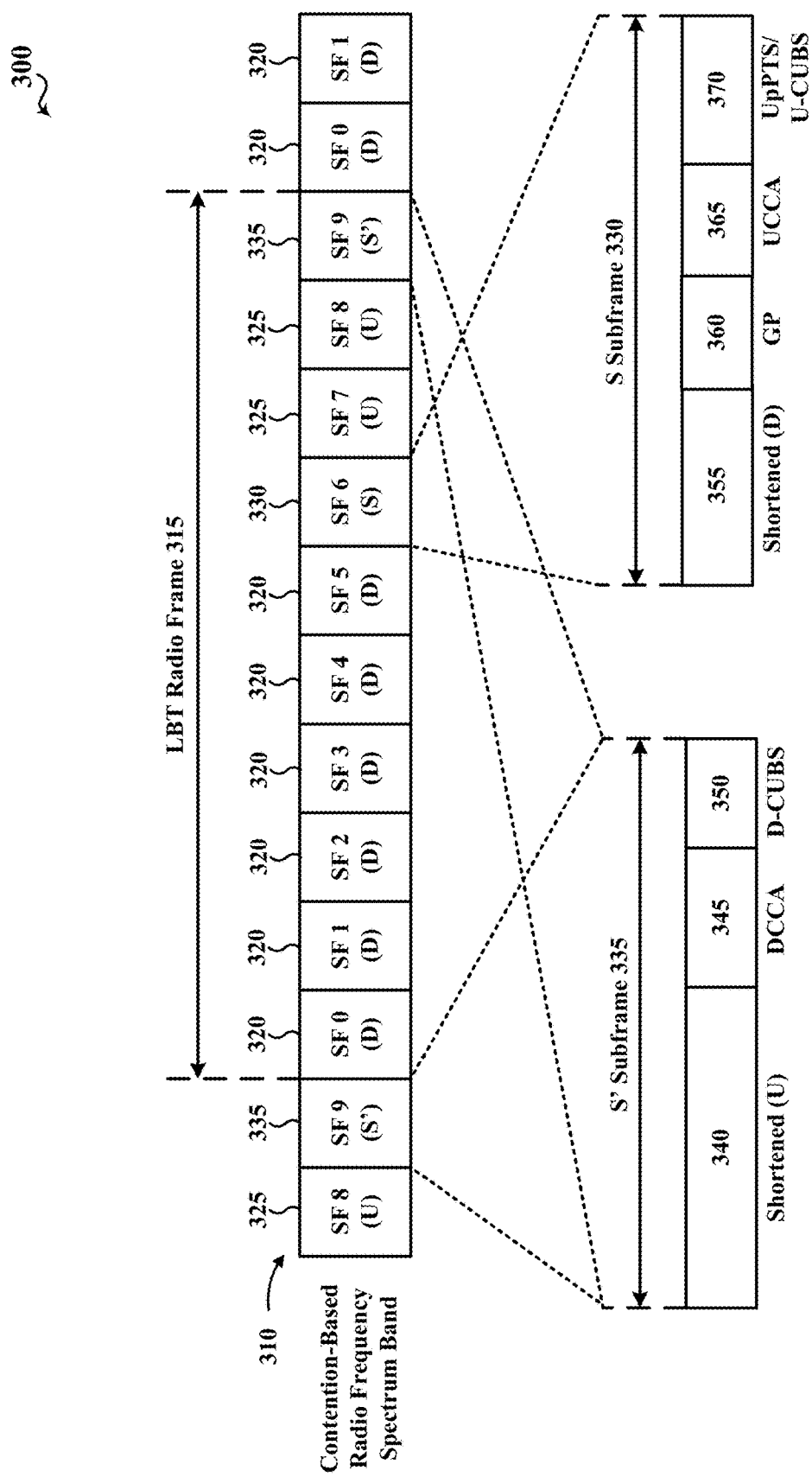
FIG. 3 shows a diagram that illustrates an example of carrier aggregation when using LTE concurrently in licensed and unlicensed spectrum according to various aspects of the present disclosure.

FIG. 3 is an illustration of an example 300 of a wireless communication 310 over an unlicensed radio frequency spectrum band, in accordance with various aspects of the present disclosure. In some examples, an LBT radio frame 315 may have a duration of ten milliseconds and include a number of downlink (D) subframes 320, a number of uplink (U) subframes 325, and two types of special subframes, an S subframe 330 and an S' subframe 335. The S subframe 330 may provide a transition between downlink subframes 320 and uplink subframes 325, while the S' subframe 335 may provide a transition between uplink subframes 325 and downlink subframes 320 and, in some examples, a transition between LBT radio frames.

During the S' subframe 335, a downlink clear channel assessment (CCA) procedure 345 may be performed by one or more base stations, such as one or more of the base stations 105, 205, or 205-*a* described with reference to FIG. 1 or 2, to reserve, for a period of time, a channel of the contention-based shared radio frequency spectrum band over which the wireless communication 310 occurs. Following a successful downlink CCA procedure 345 by a base station, the base station may transmit a preamble, such as a CUBS (e.g., a downlink CUBS (D-CUBS 350)) to provide an indication to other base stations or apparatuses (e.g., UEs, WiFi access points, etc.) that the base station has reserved the channel. In some examples, a D-CUBS 350 may be transmitted using a plurality of interleaved resource blocks. Transmitting a D-CUBS 350 in this manner may enable the D-CUBS 350 to occupy at least a certain percentage of the available frequency bandwidth of the contention-based shared radio frequency spectrum band and satisfy one or more regulatory requirements (e.g., a requirement that transmissions over an unlicensed radio frequency spectrum band occupy at least 80% of the available frequency bandwidth). The D-CUBS 350 may in some examples take a form similar to that of an LTE/LTE-A cell-specific reference signal (CRS) or a channel state information reference signal (CSI-RS). When the downlink CCA procedure 345 fails, the D-CUBS 350 may not be transmitted.

The S' subframe 335 may include a plurality of OFDM symbol periods (e.g., 14 OFDM symbol periods). A first portion of the S' subframe 335 may be used by a number of UEs as a shortened UL (U) period 340. A second portion of the S' subframe 335 may be used for the DL CCA procedure 345. A third portion of the S' subframe 335 may be used by one or more base stations that successfully contend for access to the channel of the contention-based shared radio frequency spectrum band to transmit the D-CUBS 350.

During the S subframe 330, an UL CCA procedure 365 may be performed by one or more UEs, such as one or more of the UEs 115, 215, 215-a, 215-b, or 215-c described above with reference to FIG. 1, 2A, or 2B, to reserve, for a period of time, the channel over which the wireless communication 310 occurs. Following a successful UL CCA procedure 365 by a UE, the UE may transmit a preamble, such as an UL CUBS (U-CUBS 370) to provide an indication to other UEs or apparatuses (e.g., base stations, WiFi access points, etc.) that the UE has reserved the channel. In some examples, a U-CUBS 370 may be transmitted using a plurality of interleaved resource blocks. Transmitting a U-CUBS 370 in this manner may enable the U-CUBS 370 to occupy at least a certain percentage of the available frequency bandwidth of the contention-based radio frequency spectrum band and satisfy one or more regulatory requirements (e.g., the requirement that transmissions over the contention-based radio frequency spectrum band occupy at least 80% of the available frequency bandwidth). The U-CUBS 370 may in some examples take a form similar to that of an LTE/LTE-A CRS or CSI-RS. When the UL CCA procedure 365 fails, the U-CUBS 370 may not be transmitted.

The S subframe 330 may include a plurality of OFDM symbol periods (e.g., 14 OFDM symbol periods). A first portion of the S subframe 330 may be used by a number of base stations as a shortened DL (D) period 355. A second portion of the S subframe 330 may be used as a guard period (GP) 360. A third portion of the S subframe 330 may be used for the UL CCA procedure 365. A fourth portion of the S subframe 330 may be used by one or more UEs that successfully contend for access to the channel of the contention-based radio frequency spectrum band as an UL pilot time slot (UpPTS) or to transmit the U-CUBS 370.

In some examples, the downlink CCA procedure 345 or the UL CCA procedure 365 may include the performance of a single CCA procedure. In other examples, the DL CCA procedure 345 or the uplink CCA procedure 365 may include the performance of an extended CCA procedure. The extended CCA procedure may include a random number of CCA procedures, and in some examples may include a plurality of CCA procedures.

As indicated above, FIG. 3 is provided as an example. Other examples are possible and may differ from what was described in connection with FIG. 3.

Figure 4:
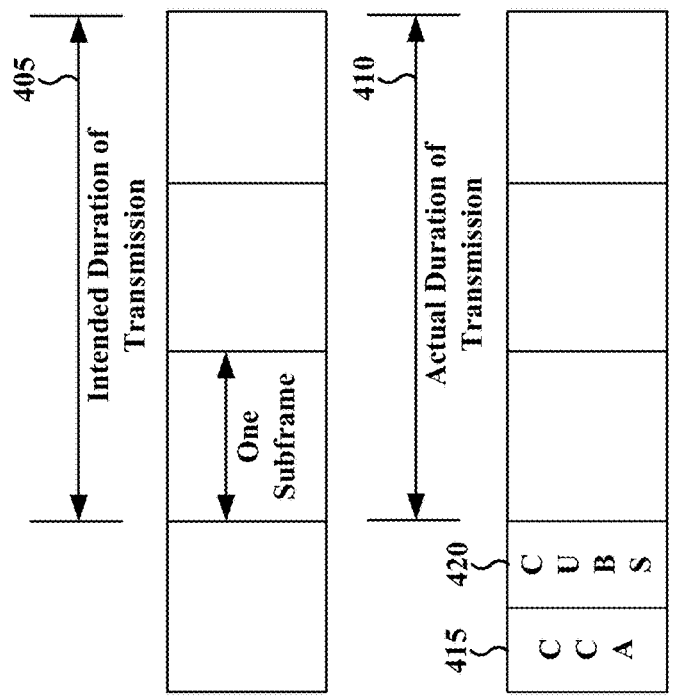
FIG. 4 shows an example of a CCA procedure performed by a transmitting apparatus when contending for access to a contention-based shared radio frequency spectrum band, in accordance with various aspects of the present disclosure.

FIG. 4 is an illustration of an example 400 of a CCA procedure 415 performed by a transmitting apparatus when contending for access to a contention-based shared radio frequency spectrum band, in accordance with various aspects of the present disclosure. In some examples, the CCA procedure 415 may be an example of the DL CCA procedure 345 or UL CCA procedure 365 described with reference to FIG. 3. The CCA procedure 415 may have a fixed duration. In some examples, the CCA procedure 415 may be performed in accordance with an LBT-frame based equipment (LBT-FBE) protocol. Following the CCA procedure 415, a channel reserving signal, such as a CUBS 420, may be transmitted, followed by a data transmission (e.g., an UL transmission or a DL transmission). By way of example, the data transmission may have an intended duration 405 of three subframes and an actual duration 410 of three subframes.

As indicated above, FIG. 4 is provided as an example. Other examples are possible and may differ from what was described in connection with FIG. 4.

Figure 5:
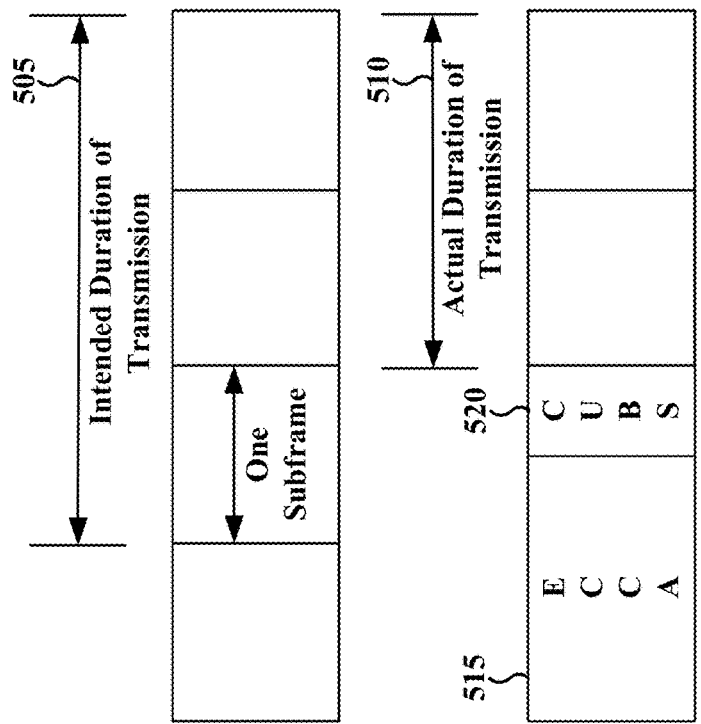
FIG. 5 shows an example of an eCCA procedure performed by a transmitting apparatus when contending for access to a contention-based shared radio frequency spectrum band, in accordance with various aspects of the present disclosure.

FIG. 5 is an illustration of an example 500 of an eCCA procedure 515 performed by a transmitting apparatus when contending for access to a contention-based shared radio frequency spectrum band, in accordance with various aspects of the present disclosure. In some examples, the eCCA procedure 515 may be an example of the DL CCA procedure 345 or UL CCA procedure 365 described with reference to FIG. 3. The eCCA procedure 515 may include a random number of CCA procedures, and in some examples may include a plurality of CCA procedures. The eCCA procedure 515 may, therefore, have a variable duration. In some examples, the eCCA procedure 515 may be performed in accordance with an LBT-load based equipment (LBT-LBE) protocol. The eCCA procedure 515 may provide a greater likelihood of winning contention to access the contention-based shared radio frequency spectrum band, but at a potential cost of a shorter data transmission. Following the eCCA procedure 515, a channel reserving signal, such as a CUBS 520, may be transmitted, followed by a data transmission. By way of example, the data transmission may have an intended duration 505 of three subframes and an actual duration 510 of two subframes.

As indicated above, FIG. 5 is provided as an example. Other examples are possible and may differ from what was described in connection with FIG. 5.

Figure 6:
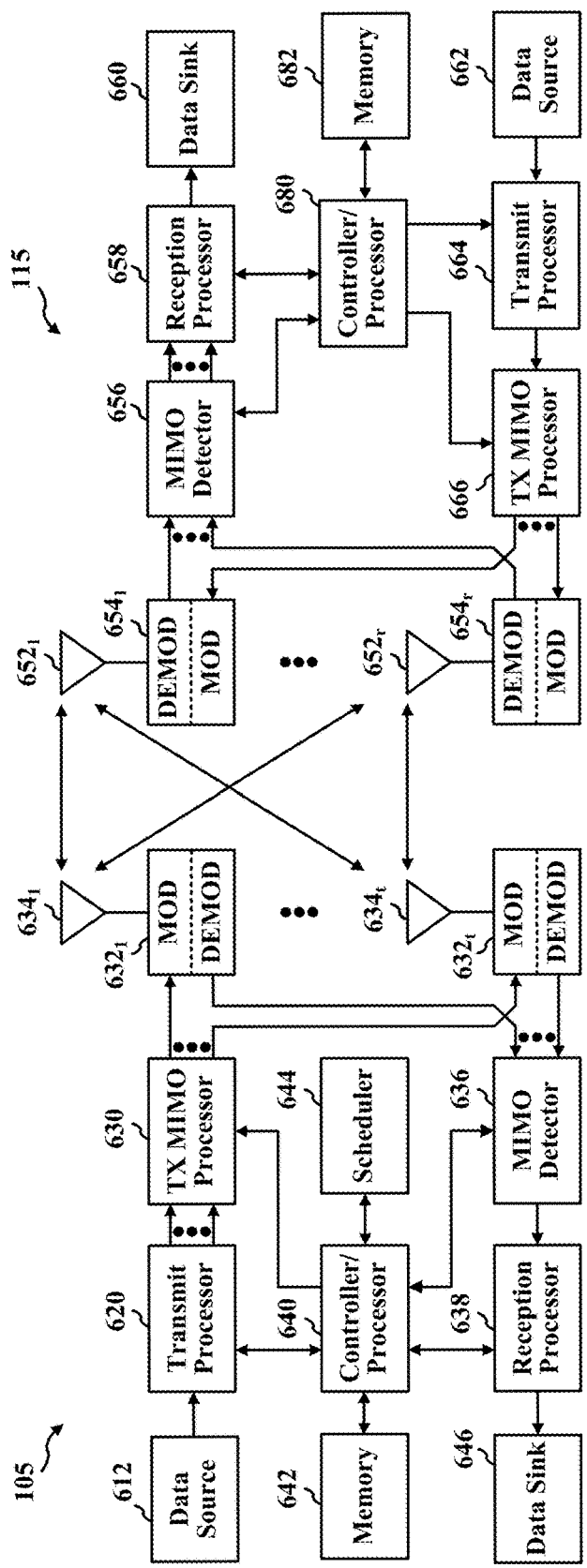
FIG. 6 shows a block diagram of a design of a base station/eNB and a UE, which may be one of the base stations/eNBs and one of the UEs in FIG. 1.

FIG. 6 shows a block diagram of a design of a base station/eNB 105 and a UE 115, which may be one of the base stations/eNBs and one of the UEs in FIG. 1. The eNB 105 may be equipped with antennas 634a through 634t, and the UE 115 may be equipped with antennas 652a through 652r. At the eNB 105, a transmit processor 620 may receive data from a data source 612 and control information from a controller/processor 640. The control information may be for the physical broadcast channel (PBCH), physical control format indicator channel (PCFICH), physical hybrid automatic repeat request indicator channel (PHICH), physical downlink control channel (PDCCH), etc. The data may be for the physical downlink shared channel (PDSCH), etc. The transmit processor 620 may process (e.g., encode and symbol map) the data and control information to obtain data symbols and control symbols, respectively. The transmit processor 620 may also generate reference symbols, e.g., for the primary synchronization signal (PSS), secondary synchronization signal (SSS), and cell-specific reference signal. A transmit (TX) multiple-input multiple-output (MIMO) processor 630 may perform spatial processing (e.g., precoding) on the data symbols, the control symbols, and/or the reference symbols, if applicable, and may provide output symbol streams to the modulators (MODs) 632a through 632t. Each modulator 632 may process a respective output symbol stream (e.g., for OFDM, etc.) to obtain an output sample stream. Each modulator 632 may further process (e.g., convert to analog, amplify, filter, and upconvert) the output sample stream to obtain a downlink signal. Downlink signals from modulators 632a through 632t may be transmitted via the antennas 634a through 634t, respectively.

At the UE 115, the antennas 652a through 652r may receive the downlink signals from the eNB 105 and may provide received signals to the demodulators (DEMODs) 654a through 654r, respectively. Each demodulator 654 may condition (e.g., filter, amplify, downconvert, and digitize) a respective received signal to obtain input samples. Each demodulator 654 may further process the input samples (e.g., for OFDM, etc.) to obtain received symbols. A MIMO detector 656 may obtain received symbols from all the demodulators 654a through 654r, perform MIMO detection on the received symbols if applicable, and provide detected symbols. A receive processor 658 may process (e.g., demodulate, deinterleave, and decode) the detected symbols, provide decoded data for the UE 115 to a data sink 660, and provide decoded control information to a controller/processor 680.

On the uplink, at the UE 115, a transmit processor 664 may receive and process data (e.g., for the PUSCH) from a data source 662 and control information (e.g., for the PUCCH) from the controller/processor 680. The transmit processor 664 may also generate reference symbols for a reference signal. The symbols from the transmit processor 664 may be precoded by a TX MIMO processor 666 if applicable, further processed by the demodulators 654a through 654r (e.g., for SC-FDM, etc.), and transmitted to the eNB 105. At the eNB 105, the uplink signals from the UE 115 may be received by the antennas 634, processed by the modulators 632, detected by a MIMO detector 636 if applicable, and further processed by a receive processor 638 to obtain decoded data and control information sent by the UE 115. The processor 638 may provide the decoded data to a data sink 646 and the decoded control information to the controller/processor 640.

The controllers/processors 640 and 680 may direct the operation at the eNB 105 and the UE 115, respectively. The controller/processor 640 and/or other processors and components at the eNB 105 may perform or direct the execution of various processes for the techniques described herein. The controllers/processor 680 and/or other processors and components at the UE 115 may also perform or direct the execution of the functional blocks illustrated in FIGS. 12-17, and 20-22, and/or other processes for the techniques described herein. The memories 642 and 682 may store data and program codes for the eNB 105 and the UE 115, respectively. A scheduler 644 may schedule UEs for data transmission on the downlink and/or uplink.

A device, such as a UE, may have multiple antennas (N) to use for receiving and/or transmitting signals. The device may divide the use and assignment of the antennas to use for particular radio access technologies (RATs), such as LTE, WiFi, etc., for particular carrier frequencies, or both. For example, the device may use a fixed number of antennas for one carrier in CA cases, or it may use a fixed number of antennas for WiFi when the device supports both WiFi and other technologies, such as LTE. In one example, a UE may have four antennas and assign two of the antennas for WiFi communication and two antennas for LTE communications. A device, such as a UE, may also dynamically or semi-statically select a number of antennas for one technology or one carrier (antenna selection). In such dynamic or semi-static schemes, the sharing or selection may be triggered by a particular measurement result, such as channel quality indicator (CQI), reference signal receive power (RSRP), and the like.

Communications networks, such as LTE, may have frequency division multiplexing (FDM) implementations and time division multiplexing (TDM) implementations. Sharing options in FDM implementations are not truly sharing different antennas, but rather sharing the frequency spectrum received over the antenna. For example, a UE may use a diplexer/switch in order to use all antennas at the same time for different air-interfaces. The diplexer/switch acts as a filter by filtering out the unwanted frequencies. However, in such FDM sharing schemes, there is typically a considerable loss in signal strength as the signals are filtered. Such losses can also increase with the higher frequency bands. TDM implementations may actually use or assign separate antennas for each air-interface/technology. Thus, when communications over such air-interfaces/technologies are not in use, those antennas that were assigned or designated for the unused communications may be shared with other air-interfaces/technologies. The various aspects of the present disclosure are directed to communication systems using TDM implementations.

As illustrated in connection with FIGS. 4 and 5, for downlink transmissions in LAA LTE, a node must perform a CCA/eCCA before the transmission. For uplink transmissions, a UE may not transmit until it is scheduled. Therefore, in order to schedule the UE for uplink transmission, an eNB must capture the medium, by performing a CCA/eCCA procedure, in order to transmit the scheduling information to the UE. After receiving the scheduling information, the UE also needs to capture the medium, by performing a CCA/eCCA procedure, in order transmit data.

For UL heavy configuration (or scenarios), the standard frame based communication structure may be insufficient. First, the eNB may have difficulty capturing the medium in the presence of a large number of WiFi nodes. Furthermore, interference conditions at the UEs are unclear, therefore each scheduled UE's ability to perform a successful individual CCA/eCCA to capture the medium at the scheduled resource, after being scheduled, is precarious and unknown. Finally, the rate at which a UE captures the medium (relative to other UEs) may not lead to fair usage of the medium.

Various aspects disclosed herein provide for mechanisms by which an eNB can more reliably allocate spectrum to different UEs in a contention-based carrier environment. Certain aspects relate to a technique by which a UE can receive a grant confirming allocation of resources for an UL transmission on the contention-based spectrum after capturing the spectrum. Other aspects relate to a flexible frame structure capable of accommodating a flexible ratio of DL:UL subframes by only indicating a DL portion of a frame to UEs prior to a DL transmission, while supporting an arbitrary series subsequent UL subframes.

Figure 7:
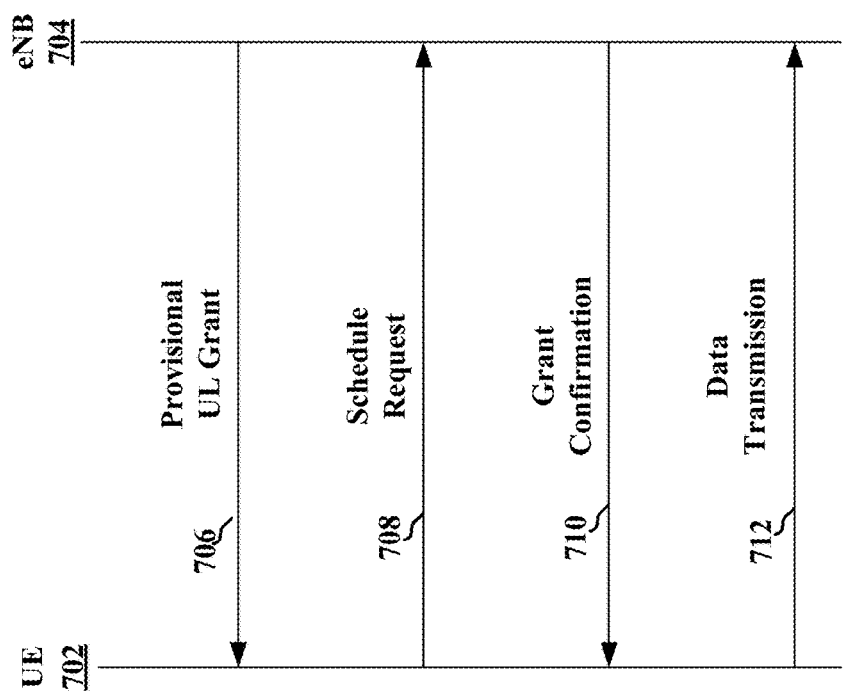
FIG. 7 shows an example of a UL scheduling in accordance with aspects of the present disclosure.

FIG. 7 illustrates aspects of an alternative to contention based access on the PUSCH. In FIG. 7, instead of transmitting data on the PUSCH based on the scheduled Modulation and Coding Scheme (MCS) upon clearing CCA/eCCA (e.g., as illustrated in FIGS. 4 and 5), the UE 702 may instead send a schedule request (SR) 708 on the SCC on which it was scheduled upon clearing CCA/eCCA. The SR may be based on a provisional UL grant 706 received from the eNB 704 prior to transmission of the SR. In response to the SR, the eNB 704 may transmit a grant confirmation 710 to indicate that the provisional UL grant to the UE is confirmed.

In a first aspect, the provisional UL grant 706 may assign modulation and coding for the UL transmission and include specific uplink resources. The grant confirmation 710 may grant/confirm the UL resources to the UE for data transmission.

In a second aspect, the provisional UL grant 706 may assign modulation and coding for the UL transmission, without assigning specific uplink resources. In this aspect, the provisional grant may potentially restrict subframes for UL transmission. For example, the provisional grant may identify a set of potential resources for uplink transmission. Thereafter, the grant confirmation may identify which uplink resources are assigned to the UE for UL transmission.

In a third aspect, the provisional UL grant 706 may identify a plurality of potential uplink transmission property sets, each set including uplink resources, modulation and coding schemes, or other transmission information. In this aspect, the provisional grant may identify one of the transmission property sets for UL transmission. For example, the provisional grant may identify a set to use for uplink transmission. Thereafter, the grant confirmation may identify which of the reserved resources are assigned to the UE for UL transmission, and may transmit based on the identified transmission properties.

After receiving the confirmed grant, the UE transmits data 712 according to the UL grant. The provisional grant may be a Semi-Persistent Scheduling (SPS) grant. This may eliminate the need for the eNB to continually grant the medium in order to schedule UL traffic.

The transmission time for the SR may be short. The SR may correspond to approximately one CCA slot, e.g., 20 μs. The SR may also be configured to have a length that is shorter than 20 μs. Alternately, the SR may also be longer than 20 μs.

The SR may include a payload indicating that the UE won contention. The grant confirmation sent by the eNB may be transmitted, e.g., one CCA slot later. The grant confirmation may indicate that the UE should transmit on the PUSCH with its previously scheduled MCS in its provisional grant. The grant confirmation may assign resources to the UE for UL transmission. The response time may be 20 μs shorter than interframe spacing. The transmission time of the UL grant confirmation may correspond to approximately 1 CCA slot, e.g., 20 μs. In other examples, the grant confirmation may be longer or shorter than 20 μs.

The SR may identify the UE to the eNB. For example, the SR may include a signature sequence that assists the eNB in identifying the UE. The eNB may receive the SR and decode the SR to determine the UE sending the SR. The grant confirmation may use the signature sequence to identify the UE to which the grant confirmation is directed. For example, the grant confirmation may include the same signature sequence as the SR sent by the UE for which the grant confirmation is intended.

This scheduling provides advantages over the WiFi mechanism. For example, collisions on SR can be resolved as long as contending UEs select different signature sequences in their SR, because the eNB may decide which UE receives a grant confirmation and therefore proceeds to transmit data. Furthermore, as collisions can be resolved, a long exponential back off is not needed for SR. Signatures sequences can be managed by a serving eNB at call set up. Initial access can be based on random selection of sequences advertised in SIB. Exponential back off may still apply, e.g., for initial access.

The physical layer design may account for bursty interference, because the confirmed UL grant does not have to follow the CCA procedure. Signaling may be controlled as part of carrier Ethernet transport (CET).

Figure 8:
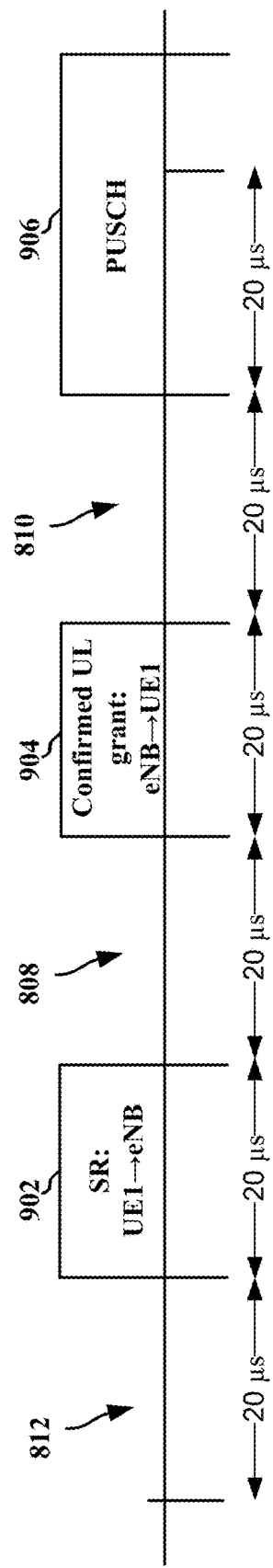
FIG. 8 shows example spacing for UL scheduling in accordance with aspects of the present disclosure.
Figure 9:
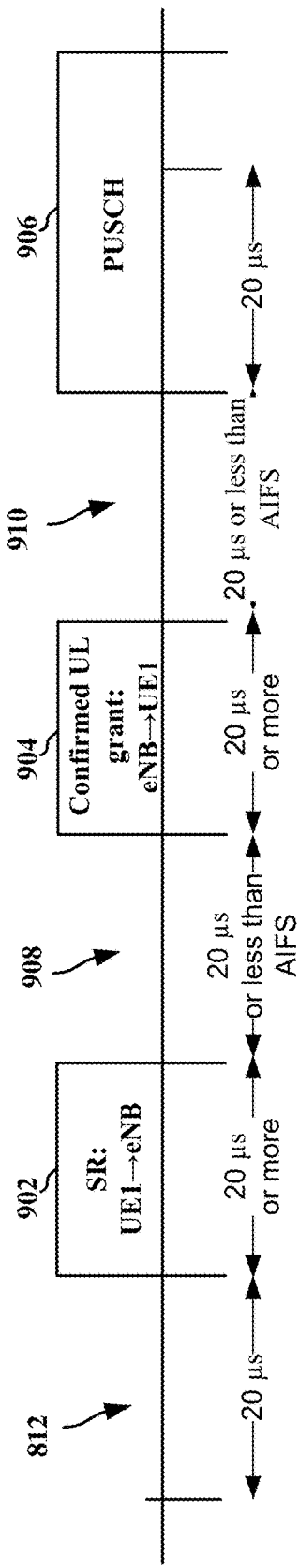
FIG. 9 shows another example of spacing for UL scheduling in accordance with aspects of the present disclosure.

FIGS. 8 and 9 illustrate examples of timeline spacing for such an UL scheduling procedure. As illustrated in FIGS. 8 and 9, the use of a provisional grant, an SR, and a grant confirmation allows for inter frame spacing, similar to Arbitration Inter-Frame Spacing (AIFS) in WiFi. For example, FIG. 8 illustrates that, after receiving a provisional grant for UL transmission from an eNB, the UE transmits an SR 902 to the eNB. Once the eNB receives the SR, it responds with a confirmed grant 904 to the UE. Then, the UE may transmit data on the PUSCH 906, e.g., according to resources identified in the confirmed grant 904. As illustrated, the SR may be approximately 20 μs, or about the length of one CCA slot. A shorter SR may be better because it allows for faster decoding by the eNB. As illustrated, the grant confirmation may be approximately 20 μs, or about the length of one CCA slot. The grant confirmation may also be longer.

The SR 902 and the grant confirmation 904 may be spaced from each other, e.g., by approximately 20 μs, or about the length of one CCA slot. Following receipt of the grant confirmation at the UE, the UE begins to transmit data 906 on the PUSCH. This data transmission 906 may be spaced from the grant confirmation 904. The spacing 808 between the SR 902 and grant confirmation 904 and the spacing 810 between the grant confirmation 904 and the data transmission 906 may be configured to be short, e.g., approximately 20 μs, or about one CCA slot. Maintaining a short spacing prevents another UE or eNB from clearing CCA/eCCA during the procedure and thereafter colliding with the data transmission 906. As illustrated, spacing 812 may also be provided between the transmission of the provisional grant from the eNB to the UE and the SR 902.

FIG. 9 illustrates an extended timeline, e.g., for use in connection with eCCA. FIG. 9 is similar to FIG. 8, except that the spacing 908 and 910 may be approximately 20 μs or less than AIFS.

Typically, a transmitter is required to clear CCA for 10 slots before being able to transmit. The use of a provisional UL grant, an SR, and a grant confirmation enables a transmitter to transmit when it clears only two consecutive CCAs over 20 micro seconds. For example, even if a second UE were to clear CCA during a spacing 908 between a first UE's SR and grant confirmation or during a spacing 910 between the grant confirmation and data transmission, it would encounter a transmission in the consecutive CCA. Thus, by requiring the second UE to clear a second CCA over the next consecutive 20 μs, the second UE would detect at least one of the SR, grant confirmations, or data transmissions corresponding to the first UE.

Figure 10:
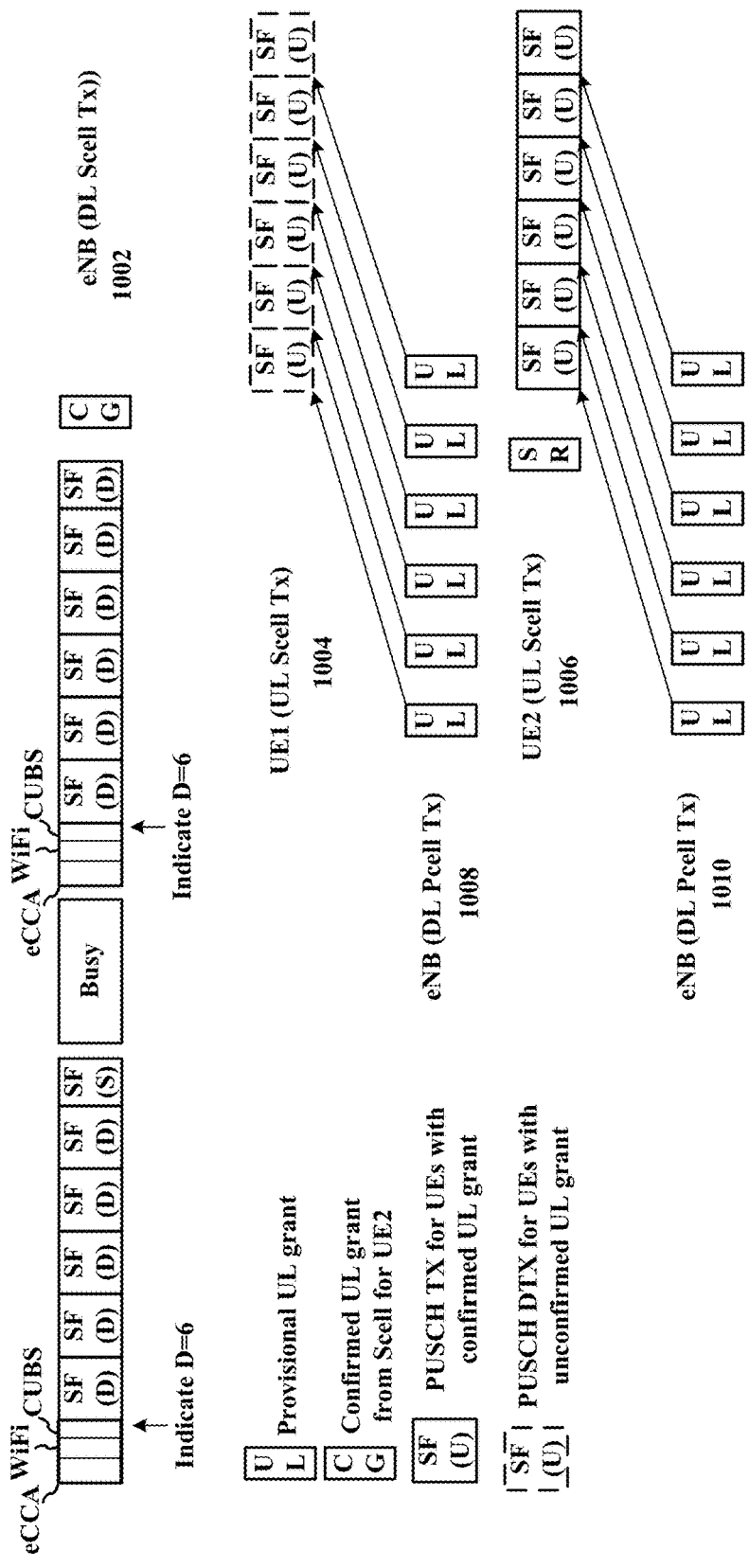
FIG. 10 shows an example configuration for UL scheduling for carrier aggregation mode, in accordance with aspects of the present disclosure.

FIG. 10 illustrates an example of UL scheduling in CA mode with the SR transmitted on an SCC. FIG. 10 illustrates the DL transmission configuration 1002 for an eNB transmitting on the SCC served by a secondary serving cell (Scell). The SCC may be a carrier operating on the unlicensed spectrum. However, in other implementations the SCC may be licensed or unlicensed.

In configuration 1002, the Scell transmission includes a portion for CCA/eCCA, WiFi Preamble (e.g., L-STF, L-LTF, L-Sig, etc.), and CUBS, followed by a number of DL subframes and an S subframe. After the S subframe, the medium is indicated as being busy. When the eNB is again able to transmit, the configuration repeats with CCA, WiFi preamble, CUBS, and DL subframes.

Also illustrated in UL transmission configurations 1004 and 1006 for two UEs, UE1 and UE2 respectively. The eNB may send provisional grants to more than one UE at a time. Thus, FIG. 10 illustrates that both UE1 and UE2 receive a provisional UL grant 1008 and 1010 from the eNB, respectively. The UL grant may be received during a time reserved for UL subframes. The provisional grant may be transmitted on a PCC served by a primary serving cell (Pcell). By transmitting the provisional grant on the Pcell, the grant can be more reliably received.

FIG. 10 illustrates an example where each UE may receive multiple DL transmissions of the provisional UL grant from the eNB. Upon receipt of the provisional grant, the UE may perform CCA/eCCA. When the UE passes the CCA procedure, the UE transmits a SR, not shown. Upon receipt of the SR, the eNB transmits a grant confirmation. The eNB may continue to repeatedly transmit the provisional grant to a UE until it receives an SR from the UE. Conversely, the eNB may signal one UL grant per subframe to each UE. Regardless of whether the provisional grant is a semi-persistent grant or an individual grant, the UE may be configured to wait to transmit data until after it wins contention and receives a grant confirmation from the eNB in response to its SR transmission.

Figure 11:
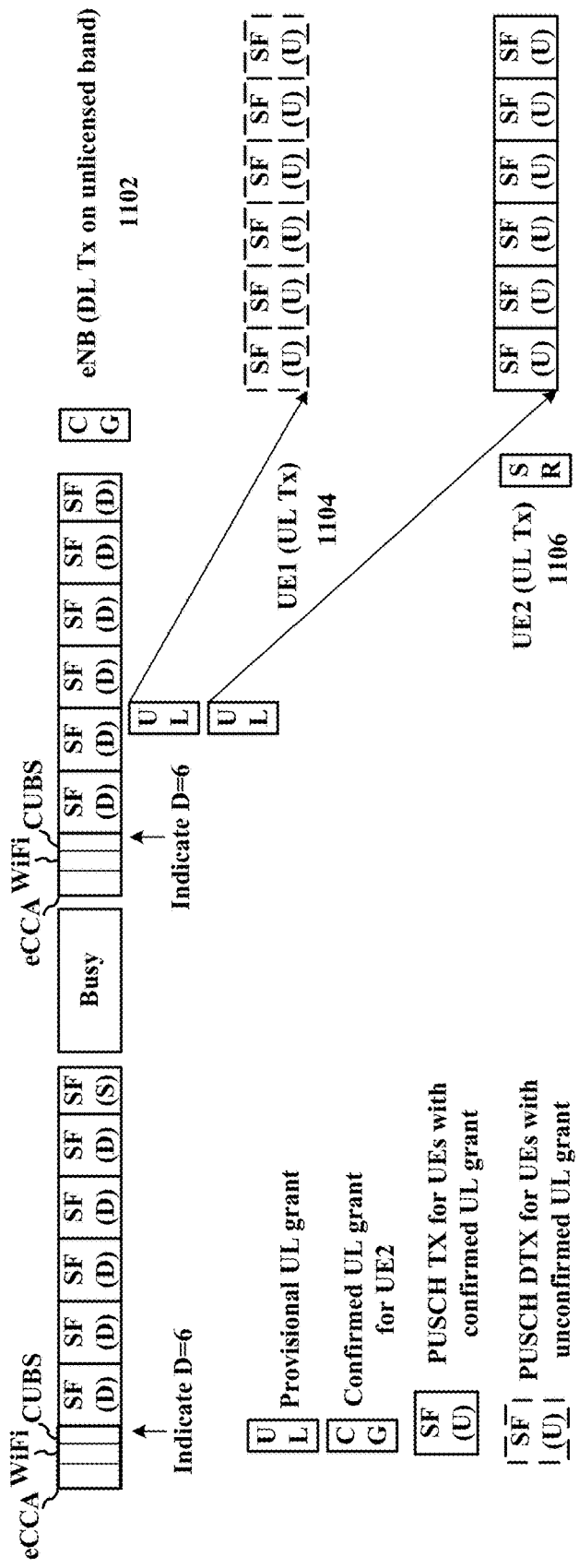
FIG. 11 shows an example configuration for UL scheduling for a single carrier mode in accordance with aspects of the present disclosure.

FIG. 11 illustrates the eNB transmitting the grant confirmation on the Scell. The eNB may receive an SR from multiple UEs, e.g., UE1 and UE2. In this case, the eNB may select which UE(s) will receive the grant confirmation. The SR may be structured to allow the eNB to detect distinct overlapping SRs from different UEs. In one example, SRs for different users may utilize different signature sequences. That would allow the eNB to detect which UE transmits the SR, e.g., to grab the medium, even if different UEs access the medium at the exact same time, or overlapping each other in time. In another example, each UE may simply send a short message with an identifier (for example C-RNTI) in the message.

FIG. 11 illustrates an example of UL scheduling for a single carrier mode, e.g., with SR on an unlicensed carrier. In FIG. 11, the provisional grant itself may be sent on the unlicensed band. Thus, UE1 and UE2 receive the provisional grant on the unlicensed band and perform CCA/eCCA on the unlicensed band. If one of the UEs passes CCA/eCCA, the UE transmits a SR on the unlicensed band to the eNB. The eNB responds with a grant confirmation on the unlicensed band. Thus, the eNB DL transmission 1102, the transmission 1104 from UE1, and the transmission 1106 from UE2 may be on the unlicensed band. In this example, the provisional grant might not be transmitted as frequently as it would be on a Pcell, as in FIG. 10. Furthermore, in this aspect, each UL grant may correspond to resources over multiple UL subframes, which may or may not be consecutive. In one example, the eNB may schedule multiple UEs with a provisional grant and then allow those UEs to contend for the scheduled resource. The grant confirmation resolves uncertainty about which UE can transmit during the scheduled resource, because the eNB indicates which UE should continue to transmit. This helps to avoid collisions during the data transmission.

The UE may continue to transmit the SR until it receives a response from the eNB, such as a grant confirmation, or until the end of a designated time. Additionally, as the UE may continue to transmit the SR until it receives the grant confirmation, the UE may be transmitting the SR at the same time that it receives the grant confirmation.

The SR may also comprise additional information. Among others, such additional information may comprise an indication that the UE has won contention. It may also include buffer status report and any other control signaling.

After sending the provisional UL grants, the eNB attempts to decode an SR from the UE(s) to which it transmitted the provisional uplink grant. For example, the eNB may attempt to detect an SR transmitted by UE(s) in the corresponding SCC.

Upon receipt of the SR, the eNB transmits a grant confirmation to the UE for which the eNB detects an SR. The grant confirmation may comprise, e.g., a grant of resources for UL data transmission. For example, the provisional grant may comprise modulation and coding but without an assignment of resources. Then, the grant confirmation may assign resources to the UE after the UE has indicated that it passed CCA/eCCA by sending an SR. As illustrated, the grant confirmation assignment may be sent on the SCC, e.g., a contention based carrier.

The grant confirmation may assign UL resources to multiple UEs that pass CCA/eCCA in a way that avoids uplink collision.

Figure 12:
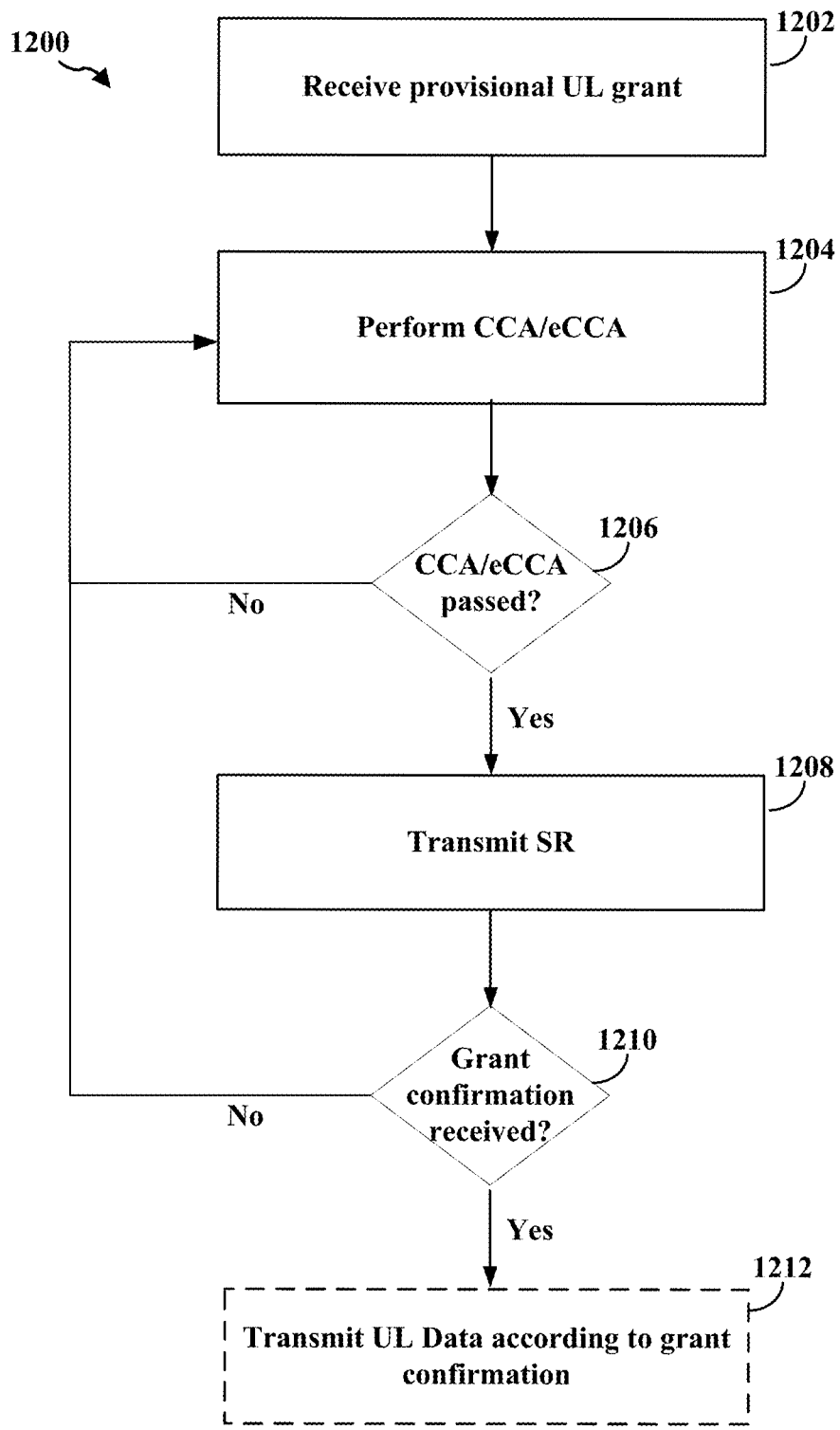
FIG. 12 shows a flow chart of a method of wireless communication in accordance with various aspects of the present disclosure.

FIG. 12 is a flow chart 1200 of a method of wireless communication. The method may be performed by a UE, (e.g., UE 115, 115-a, 115-b, or apparatus 1302, 1302'). At 1202, the UE receives a provisional grant UL assignment from an eNB. For example, the UE may receive the provisional grant UL assignment on a non-contention based carrier, such as PCC served by a Pcell, as illustrated in FIGS. 8 and 10, or on an SCC served by a Scell, as illustrated in FIG. 9. The SCC may comprise a contention-based carrier. The provisional grant assignment may comprise a target MCS in, e.g., a contention based carrier. In one example, the contention based carrier may comprise an SCC.

At 1204, the UE performs a CCA/eCCA operation based on the provisional grant UL assignment. The UE determines whether the CCA/eCCA check is passed at 1206.

Once the UE passes the CCA/eCCA operation, the UE transmits an SR at 1208 based on the provisional grant UL assignment. The SR may comprise a random access signal such as a PRACH. The SR may be approximately one CCA slot, as described in connection with FIG. 10.

The SR may be transmitted, e.g., on a contention based carrier, such as an SCC. For example, when a UE receives a provisional grant UL assignment for a target MCS in an SCC, the UE may perform a CCA/eCCA check for that SCC and may transmit an SR on that SCC.

An eNB may send a provisional grant UL transmission with assignments to multiple UEs. Thus, the SR may uniquely identify the UE among the other active UEs for which a provisional grant UL assignment was sent. For example, the SR may comprise a signature sequence that can be used by the eNB to identify which UE has passed the CCA/eCCA in order to transmit the SR. The signature sequences for selection by the UE may be managed by the eNB. For example, initial access may be based on random selection of a sequence advertised in a SIB. The SR may comprise additional information. For example, the SR may comprise a payload that indicates that the UE won contention.

The UE may continue to transmit the SR until it receives a grant confirmation response from the eNB. If no response is received from the eNB, the UE may continue to transmit the SR until the end of a designated period.

The UE may receive a grant confirmation from the eNB assigning the UE a resource for UL data transmission in response to the UE's transmission of the SR. The grant confirmation may be received on the SCC. The grant confirmation may be approximately one CCA slot, as described in connection with FIG. 10.

Thus, at 1210, the UE determines whether a grant confirmation has been received from the eNB. As the eNB may have transmitted provisional grants to multiple UEs, the grant confirmation may indicate which of the UEs is being granted a resource. For example, the grant confirmation may include the same signature sequence sent by the UE in the SR in order to indicate to the UE that it is being granted the resource.

The provisional grant assignment may give the UE modulation and coding to be used for UL transmissions without granting a specific resource. Thus, the grant confirmation may also include a grant of a resource for UL data transmission.

At 1212, the UE transmits data on the SCC after receiving the grant confirmation. If a grant confirmation is not received at 1210, the UE may again perform CCA/eCCA and transmit another SR when contention is won.

As described in connection with FIGS. 9A and 9B, the grant confirmation may be spaced from the CCA operation. The provisional grant and the SR may be spaced from each other. The SR and the grant confirmation may similarly be spaced from each other. The spacing between, e.g., the SR and the grant confirmation may be approximately one CCA slot, or approximately 20 μs.

The provisional grant UL assignment and the grant confirmation may be received on a contention-based carrier, as illustrated in FIG. 11. As an alternative, the provisional grant UL assignment may be received on a non-contention carrier, such as a Pcell, which may be a non-contention carrier, as illustrated in connection with FIGS. 8 and 10. The use of a Pcell for the provisional grant UL assignment may allow it to be sent more consistently.

Figure 13:
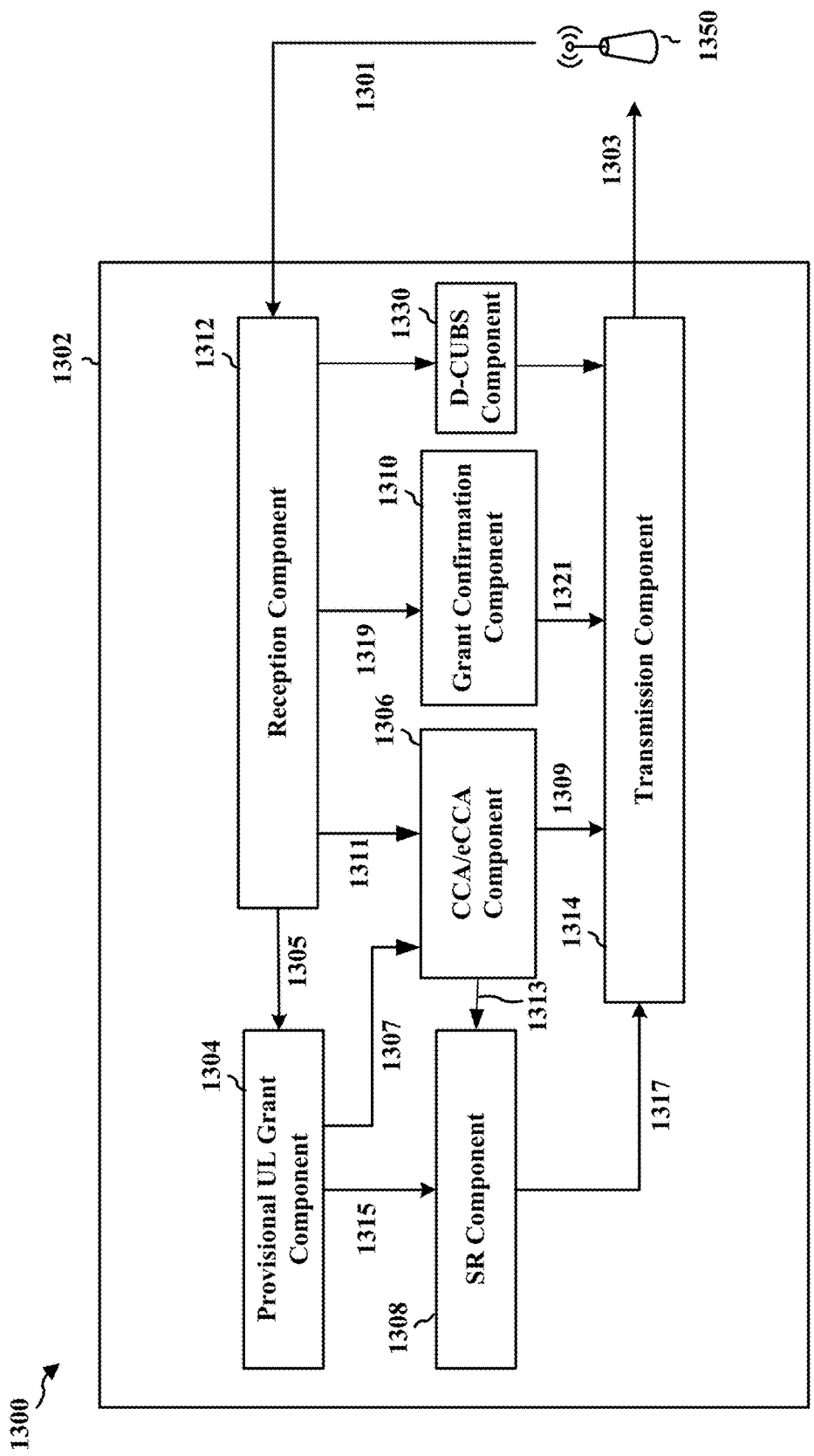
FIG. 13 shows a conceptual data flow diagram illustrating the data flow between different means/components in an exemplary apparatus.

FIG. 13 is a conceptual data flow diagram 1300 illustrating the data flow between different means/components in an exemplary apparatus 1302. The apparatus may be a UE that receives transmissions 1301 from an eNB 1350 and that sends transmissions 1303 to eNB 1350. The apparatus includes a reception component 1312 that receives transmissions 1301 from the eNB 1350 and communicates the transmission to other components of apparatus 1302. For example, when a provisional grant UL assignment is received at the reception component 1312, the reception component 1312 may output at 1305 the provisional grant to the provisional UL grant component 1304. The provisional UL grant component 1304 may process the provisional UL grant assignment in order to determine a modulation and coding for an SR requesting scheduling for UL transmission. The UL transmission may be on a contention-based carrier, such as an SCC. Thus, the provisional UL grant component 1304 may provide this information to a CCA/eCCA component 1306 that is configured to perform a CCA/eCCA operation based on the provisional UL grant assignment using information received at 1307. The CCA/eCCA component 1306 then outputs at 1309 instructions for the transmission component 1314 to perform a CCA/eCCA. The CCA/eCCA component may determine that a CCA/eCCA operation succeeds, e.g., based on transmissions received from the eNB at reception component 1312 and output to the CCA/eCCA component 1306 at 1311. The CCA component 1306 may then output an indication to the SR component 1308 at 1313 that the CCA/eCCA operation was successful. Using information output from the provisional UL grant component 1304 to the SR component 1308 at 1315, the SR component 1308 outputs instructions to the transmission component 1314 at 1317 for transmitting an SR based on the provisional grant UL assignment when the CCA operation succeeds. The SR may be used by the eNB in order to send a grant confirmation specifying resources for the uplink data transmission from the apparatus 1302. Thus, the reception component 1312 may receive a grant confirmation in response to the SR transmission and may output at 1319 information for the grant confirmation to a grant confirmation component 1310. The grant confirmation component 1310 may output, e.g., at 1321, instructions to transmission component 1314 for data transmission at a resource identified in the grant confirmation.

Figure 20:
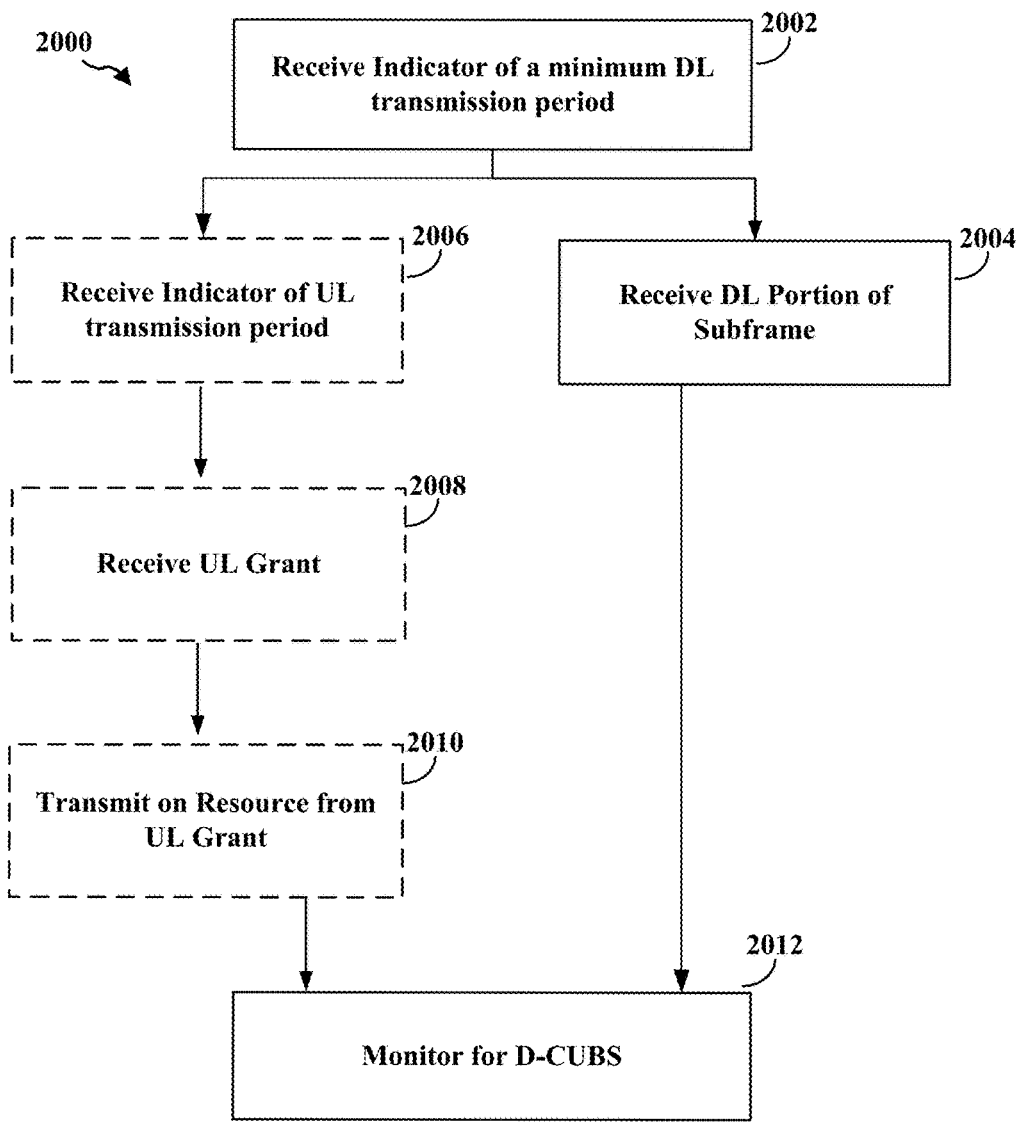
FIG. 20 shows a flow chart of a method of wireless communication in accordance with various aspects of the present disclosure.
Figure 22:
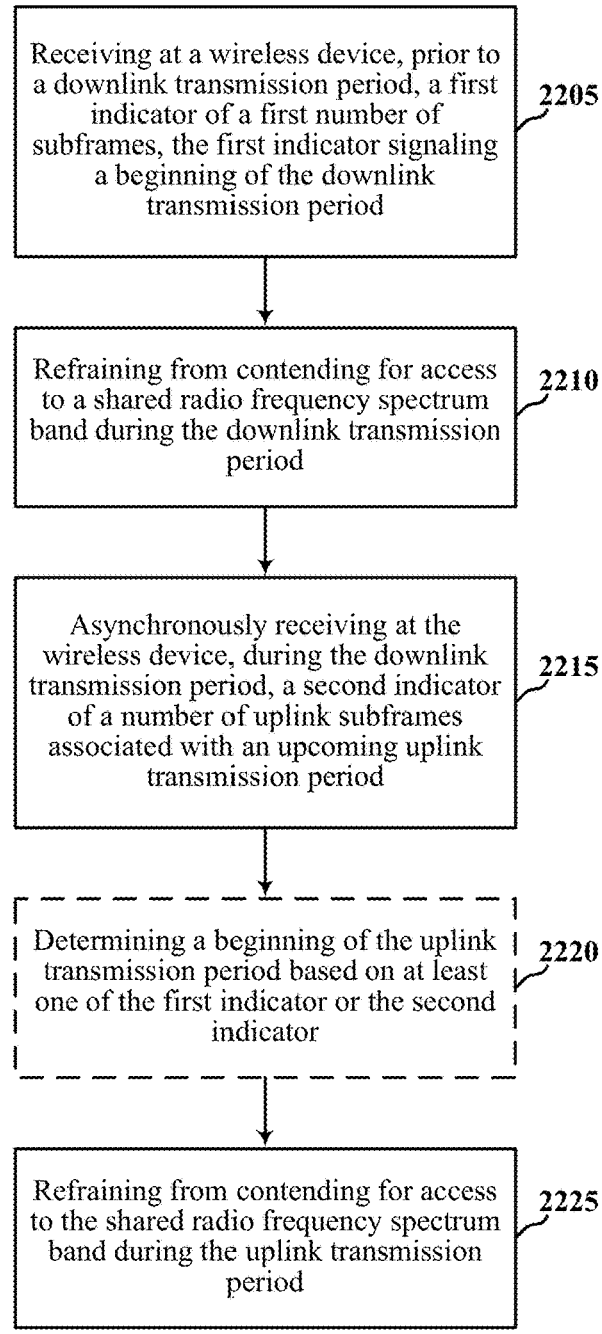
FIG. 22 shows a flow chart of a method of wireless communication in accordance with various aspects of the present disclosure.

The apparatus may include additional components that perform each of the blocks of the algorithm in the aforementioned flow charts of FIG. 12, FIG. 20, and/or FIG. 22. As such, each block in the aforementioned flow charts of FIG. 12, FIG. 20, and/or FIG. 22 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
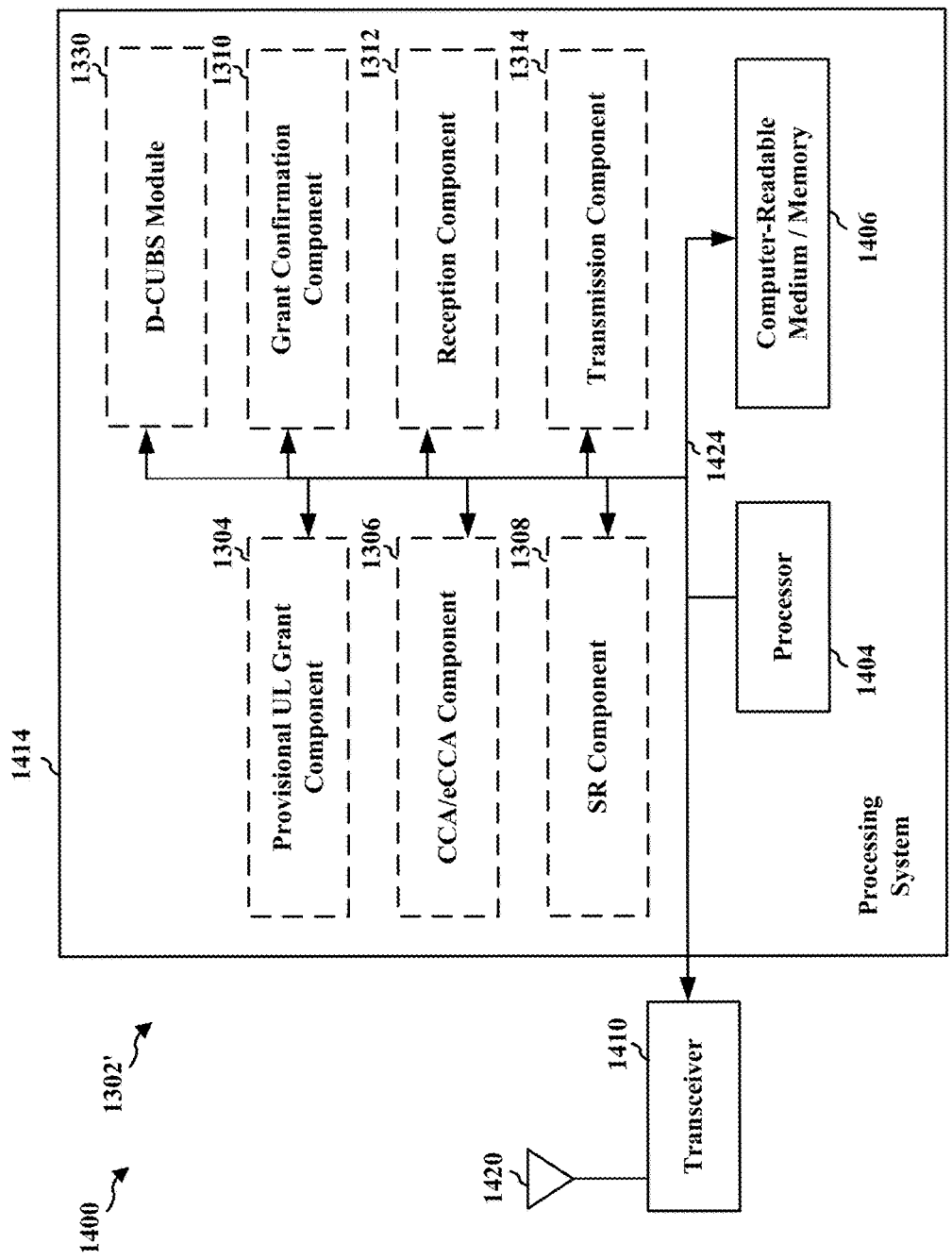
FIG. 14 shows a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310, 1312, 1314, and 1330 and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1312. In addition, the transceiver 1410 receives information from the processing system 1414, specifically the transmission component 1314, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system further includes at least one of the components 1304, 1306, 1308, 1310, 1312, 1314, and 1330. The components may be software components running in the processor 1404, resident/stored in the computer readable medium/memory 1406, one or more hardware components coupled to the processor 1404, or some combination thereof. The processing system 1414 may be a component of the UE 115, 115-a, 115-b, or 1302 and may include the memory 682 and/or at least one of the TX processor 664, the RX processor 658, and the controller/processor 680.

In one configuration, the apparatus 1302/1302' for wireless communication includes means for receiving a provisional grant UL assignment at a UE, such as provisional UL grant component 1304 and/or reception component 1312, means for performing a clear channel assessment (CCA) operation on a SCC based on the provisional grant assignment, the SCC being a contention-based carrier. Such means may include CCA/eCCA component 1306. The apparatus may include means for transmitting an SR on the SCC when the CCA operation succeeds, the SR identifying the UE to the eNB, such as SR component 1308 and/or transmission component 1314. The apparatus 1302/1302' may further include means for receiving a grant confirmation on the SCC in response to the SR transmission, such as grant confirmation component 1310 and/or reception component 1312. The grant confirmation may include grant UL resources to the UE for data transmission. The provisional grant UL assignment and the grant confirmation may be received on a contention based carrier. The provisional grant UL assignment may be received on a non-contention based carrier, such as a Pcell. Once a grant confirmation is received the apparatus may be configured to transmit data based on the resource granted in the grant confirmation. Thus, the apparatus 1302/1302' may include means for transmitting data in response to a grant confirmation that assigns a resource for data transmission. The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 664, the RX Processor 658, and the controller/processor 680. As such, in one configuration, the aforementioned means may be the TX Processor 664, the RX Processor 658, and the controller/processor 680 configured to perform the functions recited by the aforementioned means.

Figure 15:
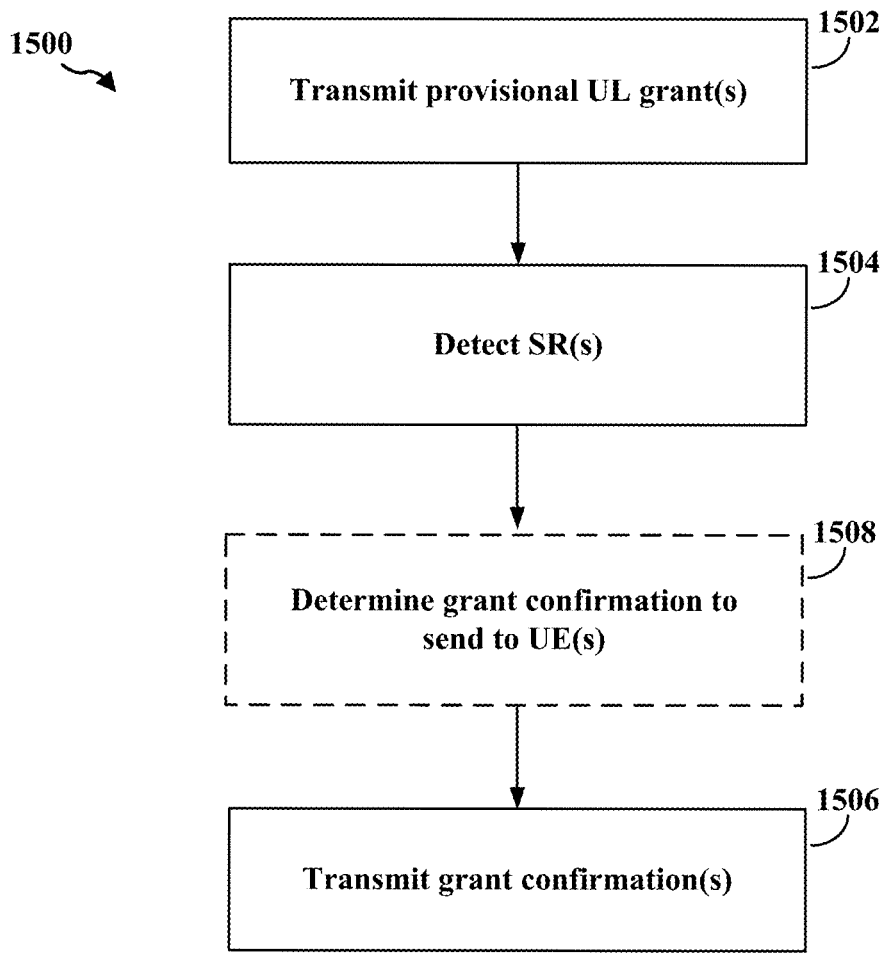
FIG. 15 shows a flow chart of a method of wireless communication in accordance with various aspects of the present disclosure.

FIG. 15 is a flow chart 1500 of a method of wireless communication. The method may be performed by an eNB, (e.g., eNB 105, 105-a, 105-b or the apparatus 1602, 1602'). In FIG. 15, steps represented with dashed borders, such as step 1508, represent optional steps.

At 1502, the eNB transmits a provisional grant UL assignment to at least one UE. Thus, the eNB may transmit provisional grant UL assignments to a set of multiple UEs. The provisional grant UL assignment may be for a contention based carrier.

At 1504, the eNB detects an SR transmission from a UE in response to the provisional grant UL assignment transmission. The SR may be received on an SCC, the SCC being a contention based carrier. Receiving the SR from the UE indicates that the UE passed a CCA/eCCA check.

As the eNB might send provisional grants to multiple UEs for the same target resource, each SR may uniquely identify one of the UEs among those to which a provisional was transmitted. For example, SRs for different users may utilize different signature sequences, each UE may simply send a short message with an identifier (for example C-RNTI) in the message, etc. The provisional grant may identify which UE(s) can contend for PUSCH transmission and if they win contention, which MCS to use.

At 1506, the eNB transmits a grant confirmation on the SCC to the UE in response to the detected SR. Thus, once the eNB detects a signature sequence or a message from a UE that grabs the medium by transmitting an SR, the eNB may send a message to that UE confirming that it can start transmitting data on PUSCH. The grant confirmation may comprise a grant of UL resources for UL data transmission by the UE.

The eNB may over-schedule by sending provisional grant UL assignments to multiple UEs. Thus, at 1502, the transmission of the one or more provisional grant UL assignments may include transmitting a plurality of provisional grant UL assignments to a plurality of UEs.

At 1504, the detection of the one or more SR transmissions may include detecting a plurality of SR transmissions in response to the transmitted provisional grant UL assignments, each SR uniquely identifying one of the UEs.

At 1508, the eNB may determine the grant confirmations to send to the UEs for which an SR is detected. This may include determining which of the UEs will receive a grant confirmation granting it UL resources for data transmission. When multiple SRs are received, the eNB may determine grant confirmations that grant UL resources to a plurality of UEs, while avoiding collisions. The SR enables the eNB to know which UEs have passed CCA/eCCA prior to scheduling resources so that resources are not unnecessarily wasted by granting them to a UE that does not pass CCA/eCCA. For example, once the eNB determines the UEs that pass the CCA/eCCA check the eNB may instruct the UEs to avoid collision by granting resources based on the more accurate understanding provided by the SRs.

As SRs may be received from multiple UEs, each SR may identify the UE to the eNB. Similarly, the grant confirmation may indicate which UE is being granted the resources. For example, each SR may comprise a unique signature sequence that identifies the UE to the eNB. Likewise, each of the one or more grant confirmations may comprise a signature sequence corresponding to a UE selected to transmit data. Thus, the SR and the corresponding grant confirmation may comprise the same signature sequence. The signature sequences for active UEs may be managed by the eNB. For example, initial access may be based on a random selection of a sequence advertised in a SIB.

The grant confirmation may be spaced from the SR, e.g., as described in connection with FIG. 10.

The provisional grant UL assignment and the grant confirmation may both be transmitted on the SCC, which may be a contention based carrier, as described in connection with FIG. 11.

The provisional grant UL assignment may be transmitted on a non-contention carrier as described in connection with FIGS. 8 and 10.

Figure 16:
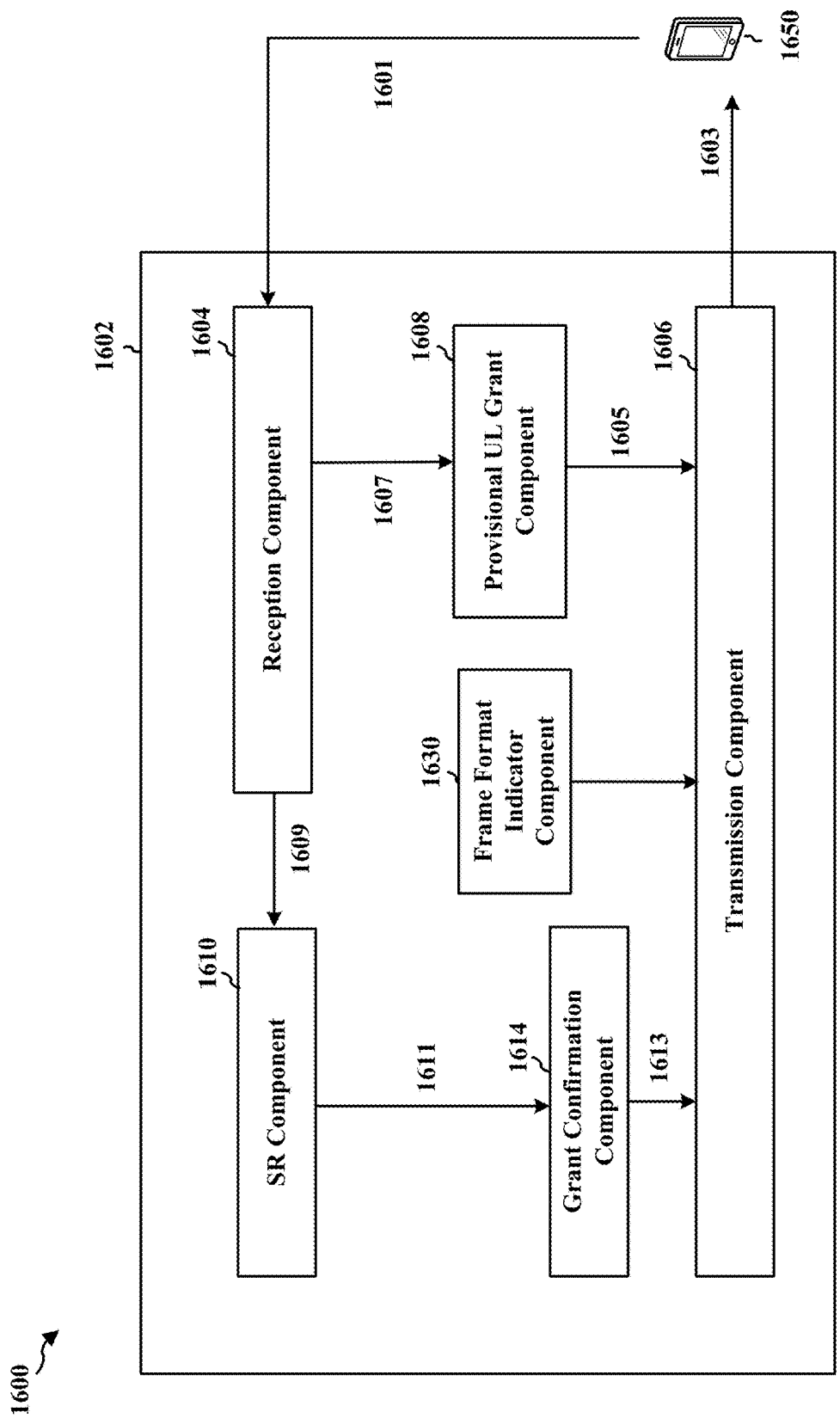
FIG. 16 shows a conceptual data flow diagram illustrating the data flow between different means/components in an exemplary apparatus.

FIG. 16 is a conceptual data flow diagram 1600 illustrating the data flow between different means/components in an exemplary apparatus 1602. The apparatus may be an eNB. The apparatus may includes a reception component 1604 that receives transmissions 1601 from UEs, e.g., UE 1650, and a transmission component 1606 that sends transmissions 1603 to UEs, e.g., UE 1650. Using instructions output to the transmission component 1606 from a provisional UL grant component 1608 at 1605, the transmission component 1606 may transmit one or more provisional grant UL assignments to a set of UEs, the set including one or more UE, e.g., UE 1650. The provisional grant UL assignment may be transmitted on a non-contention carrier, such as a PCC or on a contention based carrier such as an SCC. The provisional grant UL component may determine provisional grants at least in part using information output from reception component 1604 at 1607.

When SR transmissions are received from the UE, the reception component outputs at 1609 information from the received SR to SR component 1610 that detects one or more SR transmissions in response to the one or more provisional grant UL assignment transmissions. The SR may be received on an SCC, the SCC being a contention based carrier. Based on output 1611 regarding the received SR, the grant confirmation component 1614 outputs at 1613 instructions for the transmission component 1606 to transmit, on the SCC, one or more grant confirmations to the UE(s) of the set of UEs. The grant confirmation may assign UL resources to the UE for data transmission. Thus, the grant confirmation component may determine UL resources to grant to the UEs for which an SR was received.

At times, the apparatus may transmit a plurality of provisional grant UL assignments to a plurality of UEs. Thus, a plurality of SR transmissions may be detected by the apparatus in response to the transmitted provisional grant UL assignments, each SR uniquely identifying one of the UEs to which a provisional grant was sent. For example, each SR may comprise a unique signature sequence. The grant confirmation component may configure each of the one or more grant confirmations to comprise a signature sequence corresponding to a UE selected to transmit data.

The provisional grant UL assignment and the grant confirmation may be transmitted on a contention-based carrier. The provisional grant UL assignment may be transmitted on a non-contention carrier.

Based on the grant confirmation, the eNB may thereafter receive a data transmission from the UE(s).

Figure 21:
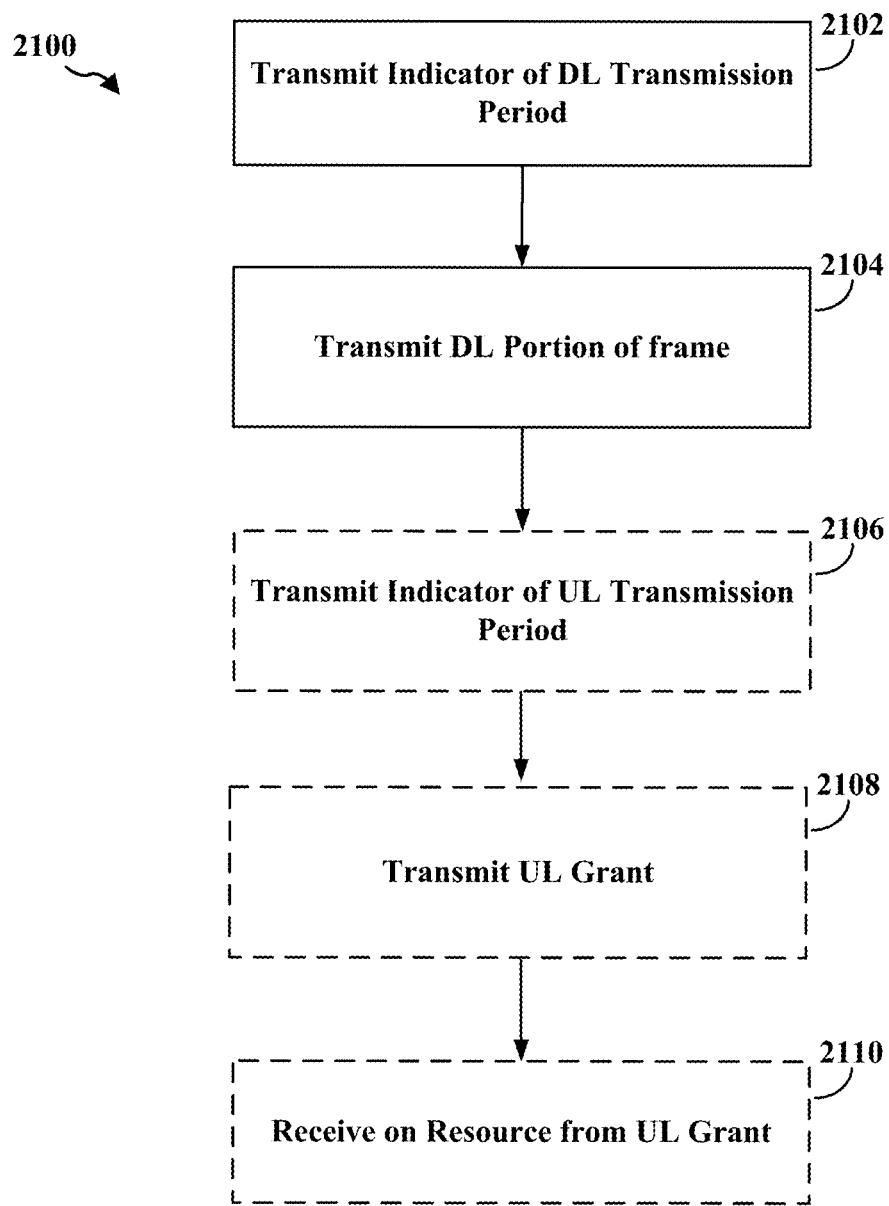
FIG. 21 shows a flow chart of a method of wireless communication in accordance with various aspects of the present disclosure.

The apparatus may include additional components that perform each of the blocks of the algorithm in the aforementioned flow charts of FIG. 15, FIG. 21, and/or FIG. 22. As such, each block in the aforementioned flow charts of FIG., FIG. 21, and/or FIG. 22 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 17:
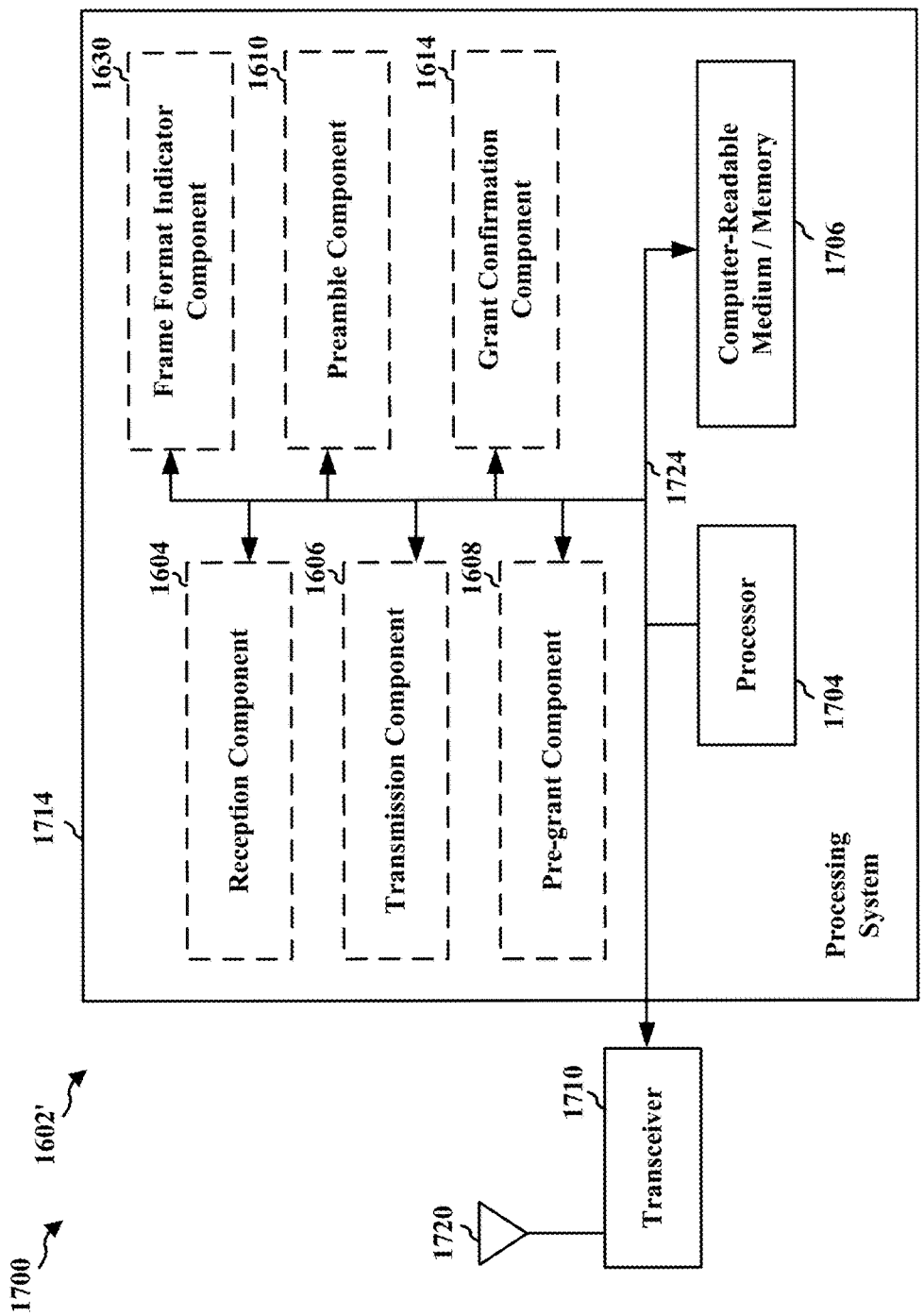
FIG. 17 shows a diagram illustrating an example of a hardware implementation for an apparatus employing a processing system.

FIG. 17 is a diagram 1700 illustrating an example of a hardware implementation for an apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware components, represented by the processor 1704, the components 1604, 1606, 1608, 1610, 1614, 1630, and the computer-readable medium/memory 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the reception component 1604. In addition, the transceiver 1710 receives information from the processing system 1714, specifically the transmission component 1606, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system further includes at least one of the components 1604, 1606, 1608, 1610, and 1614. The components may be software components running in the processor 1704, resident/stored in the computer readable medium/memory 1706, one or more hardware components coupled to the processor 1704, or some combination thereof. The processing system 1714 may be a component of the eNB 105, 105-a, 105-b, 1350, or 1602 and may include the memory 642 and/or at least one of the TX processor 620, the RX processor 638, and the controller/processor 640.

In one configuration, the apparatus 1602/1602' for wireless communication includes means for transmitting one or more provisional grant UL assignments to a set of UEs, the set including one or more UE, e.g., provisional UL Grant component 1608 and/or transmission component 1606, means for detecting one or more SR transmissions on a SCC in response to the one or more provisional grant UL transmission, e.g., reception component 1604 and/or SR component 1610, means for transmitting one or more grant confirmation assignments on the SCC, e.g., grant confirmation component 1614 and/or transmission component 1606. The apparatus may further include means for receiving a data transmission from a UE based on the grant confirmation sent to the UE. Such means may include, e.g., reception component 1604. The aforementioned means may be one or more of the aforementioned components of the apparatus 1602 and/or the processing system 1714 of the apparatus 1602' configured to perform the functions recited by the aforementioned means. As described supra, the processing system 1714 may include the TX Processor 620, the RX Processor 638, and the controller/processor 640. As such, in one configuration, the aforementioned means may be the TX Processor 620, the RX Processor 638, and the controller/processor 640 configured to perform the functions recited by the aforementioned means.

In one example, a frame format indicator for a frame of a contention based carrier may indicate to the UE only the downlink subframes, e.g., a minimum downlink transmission period, rather than indicating subframes for UL transmission along with those for DL transmission, e.g., a D:U split indication. Instead, the UE may separately receive an UL grant. For example, the UL grant may be transmitted to the UE on a Pcell. Thus, the system operates using Supplemental Uplink (SUL) operation in addition to the supplemental downlink, e.g., as described in connection with FIG. 2.

In FIG. 3, the LBT radio frame 315 has a DDDDDDSUUS' TDD frame structure. In other examples, an LBT radio frame may have a different TDD frame structure. For example, an LBT radio frame may have one of the TDD frame structures used in enhanced interference mitigation and traffic adaptation (eIMTA). In other examples, the LBT radio frame 315 may have a more dynamically determined TDD frame structure, and may be based on one or more first indicators or second indicators transmitted by a base station (e.g., a first indicator of a first number of subframes, such as an indicator of a downlink transmission period, a total number of downlink subframes in such a downlink transmission period, a total number of subframes in a combination of a downlink transmission period and an upcoming (or subsequent) uplink transmission period, and/or a second indicator of a number of uplink subframes associated with the uplink transmission period).

FIG. 18A illustrates an example contention based carrier. A frame format indicator 1802 in FIG. 18A indicates D:U=6: 3. Thus, there will be six DL subframes and 3 UL subframes. In FIGS. 18B and 18C, described herein, the frame format indicator 1804 indicates only the subframes scheduled for DL transmission on the contention based carrier.

In FIG. 18B, a UE may not assume the 'X' subframes, labeled as Subframe(X) to be an UL subframe, unless the UE is scheduled for UL transmission on those subframes. Additionally, the UE might only assume that the subframes are UL subframes for the UE when it does not receive a new PFFICH, prior to the 'X' subframes, indicating that the subframes are reserved for DL transmission. The UL grant corresponding to the 'X' subframes may be sent on a different carrier. The UL grant may be transmitted on a contention based carrier or a non-contention carrier, such as a Pcell.

As illustrated in FIG. 18B, the UE may monitor for DL CUBS, e.g., at 1806, after the DL portion of the frame, e.g., when the UE does not receive an UL grant prior to the end of the DL portion.

FIG. 18C illustrates an example in which the UE receives one or more UL grants 1808, e.g., on a Pcell. In FIG. 18C, the UE is able to transmit data during the scheduled UL subframes according to the UL grant(s). Following the UL subframes, the UE again monitors at 1810 for DL CUBS. In one example, a DL control channel may indicate opportunities for unscheduled access (such as PRACH) in addition to indication of DL Tx time. In this example, when the unscheduled access opportunity is over, the UE would again monitor for D-CUBS.

The UL grant(s) may schedule multiple UEs on the same resources. The UE may then use contention based access in order to transmit on the scheduled resources. This may improve fairness of medium access, e.g., when in the presence of a large number of WiFi stations with UL traffic. An indication may also be provided for unscheduled UL access for the contention based carrier.

Figure 19:
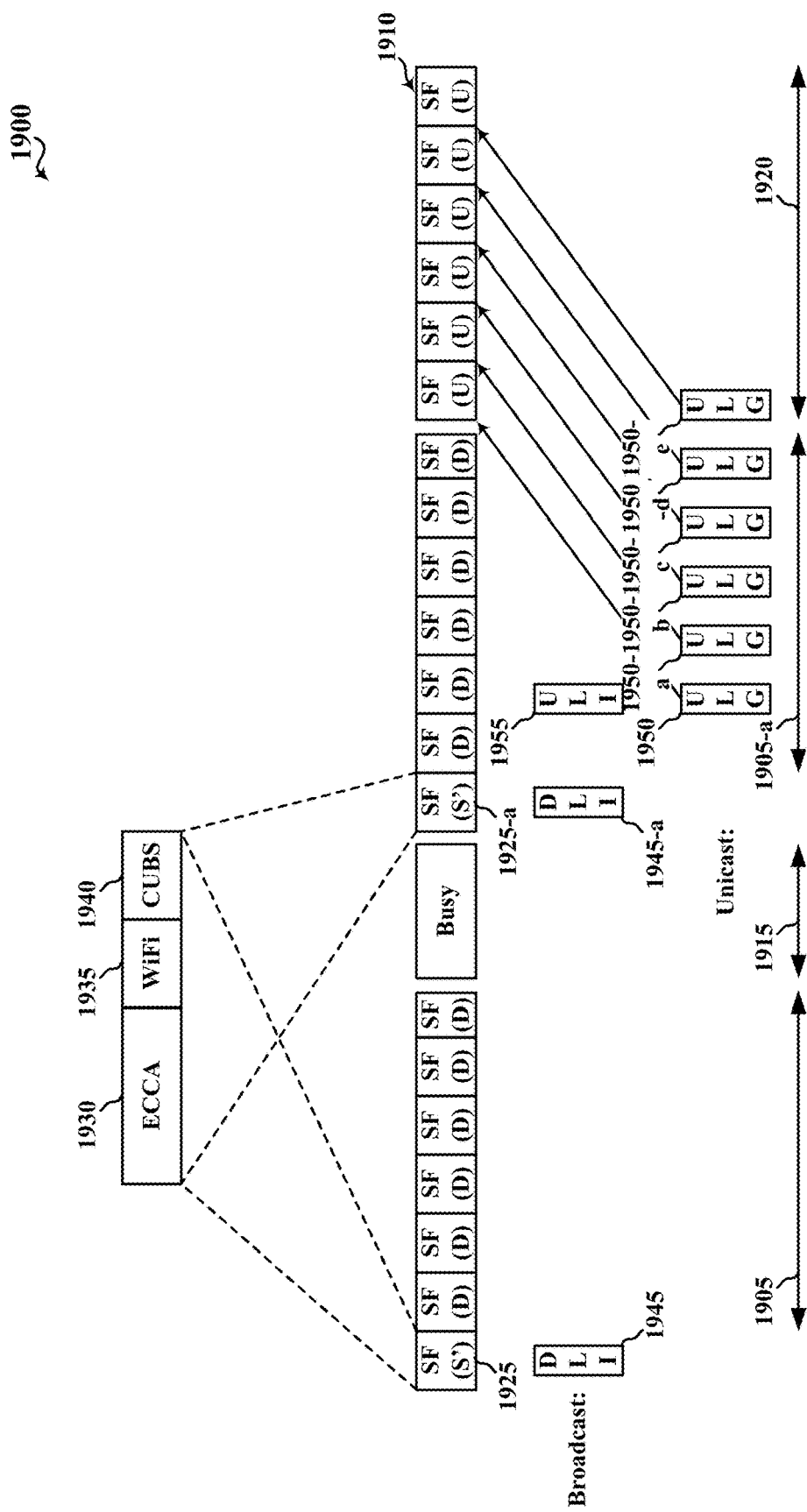
FIG. 19 shows an example configuration for indicating a DL transmission period, in accordance with the present disclosure.

FIG. 19 shows an example 1900 of a wireless communication 1910 over a shared radio frequency spectrum, in accordance with various aspects of the present disclosure. In some examples, the wireless communication 1910 may include one or more component carriers, which component carrier(s) may be transmitted, for example, as part of a transmission made according to the supplemental downlink mode (e.g., the licensed assisted access mode), the carrier aggregation mode, or the standalone mode described with reference to FIG. 2.

By way of example, the wireless communication 1910 includes a first downlink transmission period 1905, followed by a busy period 1915 (e.g., a period during which a base station cannot win contention for access to the shared radio frequency spectrum), followed by a second downlink transmission period 1905-*a*, followed by an uplink transmission period 1920. Also by way of example, the first downlink transmission period 1905 includes a first plurality of D subframes and is preceded by a first S' subframe 1925; the second downlink transmission period 1905-*a* includes a second plurality of D subframes and is preceded by a second S' subframe 1925-*a*; and the uplink transmission period 1920 includes six U subframes.

During each of the first S' subframe 1925 and the second S' subframe 1925-*a*, a base station may perform a CCA procedure, such as a single CCA procedure or an ECCA procedure 1930, to contend for access to the shared radio frequency spectrum. Upon winning contention for access the shared radio frequency spectrum, the base station may broadcast one or more signals (e.g., Wi-Fi signal 1935) to indicate the base station's reservation of the shared radio frequency spectrum to Wi-Fi nodes. The base station may also broadcast one or more signals (e.g., CUBS 1940) to indicate the base station's reservation of the shared radio frequency spectrum to base stations and other nodes of other operator deployments. Still further, the base station may broadcast a first indicator of a first number of subframes (e.g., first indicator (DLI) 1945 or 1945-*a*). The first indicator may be broadcast prior to a respective downlink transmission period (e.g., downlink transmission period 1905 or 1905-*a*), and may signal a beginning of the downlink transmission period. In some examples, the first number of subframes indicated by the first indicator may be a total number of downlink subframes in a downlink transmission period (e.g., the first indicator 1945 or 1945-*a* may indicate six subframes for each of the first downlink transmission period 1905 and the second downlink transmission period 1905-*a*). In other examples, the first number of subframes indicated by the first indicator may be a total number of subframes in a combination of a next downlink transmission period and an upcoming (or subsequent) uplink transmission period (e.g., the first indicator 1945-*a* may indicate twelve subframes in a combination of the second downlink transmission period 1905-*a* and the uplink transmission period 1920). In some examples, the first indicator may be broadcast over the shared radio frequency spectrum, or on a PFFICH, or both.

During the first downlink transmission period 1905, the base station may determine that there is heavy downlink traffic, or determine there is light or no uplink traffic, and determine to schedule the second downlink transmission period 1905-*a*. During the second downlink transmission period 1905-*a*, the base station may determine to schedule the uplink transmission period 1920 and may transmit, to a UE (or to multiple UEs), a number of uplink grants for the upcoming uplink transmission period (e.g., the uplink grants (ULGs) 1950, 1950-*a*, 1950-*b*, 1950-*c*, 1950-*d*, and 1950-*e*). In some examples, the number of uplink grants may be transmitted (e.g., unicast or multicast) on a primary cell (PCell) of the UE, over a dedicated radio frequency spectrum. Transmission of the uplink grants on a PCell, over the dedicated radio frequency spectrum, may eliminate a need to reserve the shared radio frequency spectrum at the base station for the purpose of scheduling the uplink transmission period. In other examples, the number of uplink grants may be transmitted on a SCell of the UE, over the shared radio frequency spectrum.

In one example, along with transmitting the uplink grants 1950, 1950-*a*, 1950-*b*, 1950-*c*, 1950-*d*, and 1950-*e*, the base station may asynchronously broadcast a second indicator (e.g., ULI 1955). The second indicator may be broadcast during the second downlink transmission period 1905-*a*, and may indicate a number of uplink subframes (e.g., six uplink subframes) associated with the uplink transmission period 1920. In some examples, the second indicator may be based at least in part on the number of uplink grants 1950, 1950-*a*, 1950-*b*, 1950-*c*, 1950-*d*, and 1950-*e* (e.g., the second indicator may be transmitted because the number of uplink grants are transmitted, or the number of uplink subframes indicated by the second indicator may be based at least in part on a number of uplink subframes corresponding to the number of uplink grants).

In some examples, the indicator and/or the second indicator may be broadcast over the dedicated radio frequency spectrum, and on a dedicated physical channel, on a shared physical channel, or in DCI. In other examples, the second indicator may be broadcast over the shared radio frequency spectrum, and on a dedicated physical channel, on a shared physical channel, or in DCI.

When a UE operating in a same operator deployment as the base station receives the first indicator 1945-*a*, the second indicator 1955, and the number of uplink grants 1950, 1950-*a*, 1950-*b*, 1950-*c*, 1950-*d*, and 1950-*e*, the UE may remain in an active state during the uplink transmission period 1920 (or remain active for at least a number of uplink subframes corresponding to the number of uplink grants 1950, 1950-*a*, 1950-*b*, 1950-*c*, 1950-*d*, and 1950-*e*). When a UE operating in a same operator deployment as the base station receives the first indicator 445-*a* and the second indicator 455, but not the number of uplink grants 450, 450-*a*, 450-*b*, 450-*c*, 450-*d*, and 450-*e*, the UE may enter a sleep state during the uplink transmission period 420. When a wireless device (e.g., a base station or UE) operating in a different operator deployment than the base station receives the first indicator 445-*a* or the second indicator 455, the wireless device may refrain from contending for access to the shared radio frequency spectrum during the downlink transmission period 405-*a* or the uplink transmission period 420. FIG. 20 is a flow chart 2000 of a method of wireless communication. The method may be performed by a UE, (e.g., UE 115, 115-*a*, 115-*b*, or apparatus 1302, 1302'). At 2002, the UE receives an indicator of a minimum DL transmission period. The indicator may indicate a number of DL subframes representing a minimum number of DL subframes. The UE cannot necessarily infer that UL subframes will follow the indicated DL subframes. Instead, the indicated may imply that more DL subframes may follow, but at least the indicated number of subframes will be DL subframes before the beginning of an UL subframe. The indicator may comprise a frame format indicator for a frame, wherein the frame format indicator identifies only a plurality of DL subframes scheduled for a contention-based carrier. Thus, as illustrated in FIGS. 18B, 18C and 19, in one example, the frame format indicator does not indicate subframes for UL transmission. The indicator may be received prior to a DL transmission period, and may signal a beginning of the DL transmission period. In some examples, a first number of subframes may be indicated by the first indicator, the number of subframes being a total number of downlink subframes in the downlink transmission period or a total number of subframes in a combination of the downlink transmission period and an upcoming (or subsequent) uplink transmission period.

In some examples, the indicator may be received over a shared radio frequency spectrum, or on a PFFICH, or both. The shared radio frequency spectrum may include a radio frequency spectrum for which transmitting apparatuses may need to contend for access (e.g., a radio frequency spectrum that is available for unlicensed use, such as Wi-Fi use, or a radio frequency spectrum that is available for use by multiple operators in an equally shared or prioritized manner).

At 2004, the UE receives a DL portion of the frame.

At 2006, the UE may receive a second indicator of an upcoming UL transmission period. This indicator may be received during the DL transmission period indicated by the first indicator. The second indicator may be received asynchronously. At 2008, the UE may receive an UL grant for the contention based carrier. This UL grant may be received prior to the end of the downlink subframes. The UL grant identifies at least one UL resource, e.g., in an UL subframe, assigned to the UE. The UL grant may be received on a different carrier than the contention based carrier. The UL grant may be received on a contention-based carrier or a non-contention carrier. In one example, the UL grant may be received on a Pcell that comprises a non-contention carrier.

The second indicator may be received during the downlink transmission period, and may indicate a number of uplink subframes associated with an upcoming uplink transmission period. In some examples, indicator and/or the second indicator may be received over a dedicated radio frequency spectrum, and on a dedicated physical channel, on a shared physical channel, or in DCI. The dedicated radio frequency spectrum may include a radio frequency spectrum for which transmitting apparatuses may not contend for access because the radio frequency spectrum is licensed to particular users, such as a licensed radio frequency spectrum usable for LTE/LTE-A communications. In other examples, the second indicator may be broadcast over a shared radio frequency spectrum, and on a dedicated physical channel, on a shared physical channel, or in DCI. In some examples, the downlink subframes may be contiguous, the uplink subframes may be contiguous, and/or the uplink transmission period may directly follow the downlink transmission period.

At 2010, after receiving the UL grant, the UE transmits data on the uplink resources in accordance with the received uplink grant.

As the frame format indicator does not indicate subframes reserved for UL transmission, the UE may rely on a grant of UL resources. In addition to the grant of resources, the UE may also monitor for a D-CUBS in order to determine that there is no received indication of a DL transmission during the subframes in the UL grant. Thus, at 2012, the UE monitors for a D-CUBS. The UE may monitor for the D-CUBS after the at least one UL subframe in the UL grant. For example the UE may monitor for a D-CUBS once its UL assignment has ended.

The UE may monitor for a D-CUBS after the indicated downlink portion of the frame.

For example, when the UE does not receive an UL grant prior to the end of the DL portion, the UE may monitor for the D-CUBS after the DL subframes. When the UE does receive an UL grant, the UE may monitor for a D-CUBS after at least one uplink subframe of the frame when the UE receives the uplink grant prior to the end of the downlink subframes.

The UE may further perform a CCA/eCCA operation for the contention based carrier based on the UL grant prior to transmitting data. The UE may then transmit data when the CCA/eCCA operation is successful. For example, contention based access may improve fairness of medium access in the presence of WiFi stations, etc. Also, multiple UEs may be scheduled for the same resources with UL grants and may contend for the resource.

In one example, the method may further include determining whether a number of uplink grants is received at the UE for the uplink transmission period. In some examples, a number of uplink grants may be received on a PCell of the UE, over the dedicated radio frequency spectrum. In other examples, a number of uplink grants may be received on a SCell of the UE, over the shared radio frequency spectrum. When it is determined that a number of uplink grants is received, the UE may remain in an active state for a number of UL subframes associated with the number of UL grants for the UL transmission period. When it is determined that a number of uplink grants is not received, the method may further include entering a sleep state at the wireless device during the UL transmission period. In one configuration, the apparatus 1302/1302' for wireless communication, described in connection with FIGS. 13 and 14, may include means for receiving a frame format indicator for a frame at the UE, frame format indicator identifying a minimum downlink transmission period for a contention-based carrier and for receiving a DL portion of the frame, such as reception component 1312.

The apparatus may include means for receiving an uplink grant for the contention based carrier prior to the end of the downlink subframes, wherein the uplink grant identifies at least one uplink resource assigned to the UE, the at least one uplink resource being in at least one uplink subframe. Such means may include grant confirmation component 1310 and/or reception component 1312.

The apparatus may include means for performing a clear channel assessment (CCA) operation on a SCC based on the UL grant, such as CCA/eCCA component 1306.

The apparatus may include means for transmitting data on the contention based carrier when the CCA operation succeeds, in accordance with the UL grant, such as transmission component 1314.

The apparatus 1302/1302' may further include means for monitoring for a D-CUBS, such as D-CUBS component 1330. For example, the D-CUBS component 1330 may be configured to monitor for the D-CUBS after the downlink subframes when the UE does not receive an uplink grant prior to the end of the downlink portion. When the UE receives the uplink grant prior to the end of the downlink subframes, wherein the uplink grant identifies the at least one uplink subframe, the D-CUBS component 1330 may be configured to monitor for the D-CUBS after at least one uplink subframe of the frame.

The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 664, the RX Processor 658, and the controller/processor 680. As such, in one configuration, the aforementioned means may be the TX Processor 664, the RX Processor 658, and the controller/processor 680 configured to perform the functions recited by the aforementioned means.

FIG. 21 is a flow chart 2100 of a method of wireless communication. The method may be performed by an eNB, (e.g., eNB 105, 105-*a*, 105-*b* or the apparatus 1602, 1602'). At 2102, the eNB transmits an indicator of a DL transmission period. The indicator may comprise a frame format indicator for a frame, wherein the frame indicator identifies a minimum downlink transmission period for a contention-based carrier. For example, the frame format indicator may indentify only a plurality of downlink subframes scheduled for a contention-based carrier. The frame format indicator may be transmitted on a DL control channel for the contention based carrier, such as a physical frame format indicator channel (PFFICH). At 2104, the eNB transmits on a downlink portion of the frame, as indicated.

Transmitting the indicator may comprise broadcasting an indicator of a first number of subframes from a base station. The indicator may be broadcast prior to a downlink transmission period, and may signal a beginning of the downlink transmission period. In some examples, the first number of subframes indicated by the indicator may be a total number of downlink subframes in the downlink transmission period. In other examples, the first number of subframes indicated by the indicator may be a total number of subframes in a combination of the downlink transmission period and an upcoming (or subsequent) uplink transmission period.

In some examples, the indicator may be broadcast over a shared radio frequency spectrum, or on a PFFICH, or both. The shared radio frequency spectrum may include a radio frequency spectrum for which transmitting apparatuses may need to contend for access (e.g., a radio frequency spectrum that is available for unlicensed use, such as Wi-Fi use, or a radio frequency spectrum that is available for use by multiple operators in an equally shared or prioritized manner).

At 2106, the eNB may transmit a second indicator for an UL transmission period. The second indicator may be asynchronously broadcast from a base station. The second indicator may be broadcast during the downlink transmission period, and may indicate a number of uplink subframes associated with the uplink transmission period. In some examples, the second indicator may be based at least in part on a number of uplink grants transmitted at block 2108 (e.g., the second indicator may be transmitted because the number of uplink grants are transmitted, or the number of uplink subframes indicated by the second indicator may be based at least in part on a number of uplink subframes corresponding to the number of uplink grants).

In some examples, the second indicator may be broadcast over the dedicated radio frequency spectrum, and on a dedicated physical channel, on a shared physical channel, or in DCI. In other examples, the second indicator may be broadcast over the shared radio frequency spectrum, and on a dedicated physical channel, on a shared physical channel, or in DCI. In some examples, the downlink subframes may be contiguous, the uplink subframes may be contiguous, and/or the uplink transmission period may directly follow the downlink transmission period.

At 2108, the eNB may transmit an UL grant to a UE for the contention based carrier. The UL grant may be transmitted prior to the end of the downlink subframes. The UL grant may identify at least one uplink resource assigned to the UE, the at least one uplink resource being in at least one uplink subframe. The uplink grant may be transmitted on one of the contention-based carrier or a non-contention carrier. For example, the UL grant may be transmitted on a Pcell. After transmitting the UL grant, the eNB may receive a data transmission from the UE on the uplink resources in accordance with the uplink grant at 2110.

In some examples, the number of uplink grants may be transmitted on a PCell of the UE, over a dedicated radio frequency spectrum. The dedicated radio frequency spectrum may include a radio frequency spectrum for which transmitting apparatuses may not contend for access because the radio frequency spectrum is licensed to particular users, such as a licensed radio frequency spectrum usable for LTE/LTE-A communications. Transmission of the uplink grants on a PCell, over the dedicated radio frequency spectrum, may eliminate a need to reserve the shared radio frequency spectrum at the base station for the purpose of scheduling the uplink transmission period. In other examples, the number of uplink grants may be transmitted on a SCell of the UE, over the shared radio frequency spectrum.

The eNB may transmit UL grants to a set of multiple UEs. The provisional grant UL assignment may be for a contention based carrier. Thus, the UEs may contend for the same resource after receiving the UL grant. The eNB may detect which of the UEs access the medium by detecting a demodulation reference signal (DM RS) for the UE.

In one configuration, the apparatus 1602/1602' for wireless communication, as described in connection with FIGS. 16 and 17 may include means for transmitting a frame format indicator for a frame, wherein the frame format indicator identifies a minimum downlink transmission period for a contention-based carrier for a contention-based carrier and for transmitting a DL portion of the frame, e.g., Frame Format Indicator Component 1630 and/or transmission component 1606. The apparatus 1602/1602' may further include means for transmitting an UL grant to a UE for the contention based carrier prior to the end of the downlink subframes, wherein the uplink grant identifies at least one uplink resource assigned to the UE, the at least one uplink resource being in at least one uplink subframe, e.g., grant confirmation component 1614 and/or transmission component 1606. The apparatus may further include means for receiving a data transmission from a UE based on the resources in the UL grant sent to the UE. Such means may include, e.g., reception component 1604.

The aforementioned means may be one or more of the aforementioned components of the apparatus 1602 and/or the processing system 1714 of the apparatus 1602' configured to perform the functions recited by the aforementioned means. As described supra, the processing system 1714 may include the TX Processor 620, the RX Processor 638, and the controller/processor 640. As such, in one configuration, the aforementioned means may be the TX Processor 620, the RX Processor 638, and the controller/processor 640 configured to perform the functions recited by the aforementioned means.

FIG. 22 is a flow chart illustrating an exemplary method 2200 for wireless communication, in accordance with various aspects of the present disclosure. For clarity, the method 2200 is described below with reference to a wireless device, such as a wireless device including aspects of one or more of the base stations 105, 1602, 1602' described with reference to FIGS. 1, 16, and 17, aspects of one or more of the UEs 115, 1302, 1302' described with reference to FIGS. 1, 13 and 14. In some examples, a wireless device may execute one or more sets of codes to control the functional elements of the wireless device to perform the functions described below. Additionally or alternatively, the wireless device may perform one or more of the functions described below using special-purpose hardware.

At block 2205, the method 2200 may include receiving a first indicator of a first number of subframes at a wireless device. The first indicator may be received from a base station of a different operator than the wireless operator associated with the wireless device. The first indicator may also be received prior to a downlink transmission period, and may signal a beginning of the downlink transmission period. In some examples, the first number of subframes indicated by the first indicator may be a total number of downlink subframes in the downlink transmission period. In other examples, the first number of subframes indicated by the first indicator may be a total number of subframes in a combination of the downlink transmission period and an upcoming (or subsequent) uplink transmission period.

In some examples, the first indicator may be received over a shared radio frequency spectrum, or on a PFFICH, or both. The shared radio frequency spectrum may include a radio frequency spectrum for which transmitting apparatuses may need to contend for access (e.g., a radio frequency spectrum that is available for unlicensed use, such as Wi-Fi use, or a radio frequency spectrum that is available for use by multiple operators in an equally shared or prioritized manner).

At block 2210, the method 2200 may include refraining from contending for access to the shared radio frequency spectrum during the downlink transmission period.

At block 2215, the method 2200 may include asynchronously receiving, from the base station of the different operator, a second indicator at the wireless device. The second indicator may be received during the downlink transmission period, and may indicate a number of uplink subframes associated with an upcoming uplink transmission period. In some examples, the second indicator may be received over a dedicated radio frequency spectrum, and on a dedicated physical channel, on a shared physical channel, or in DCI. The dedicated radio frequency spectrum may include a radio frequency spectrum for which transmitting apparatuses may not contend for access because the radio frequency spectrum is licensed to particular users, such as a licensed radio frequency spectrum usable for LTE/LTE-A communications. In other examples, the second indicator may be broadcast over a shared radio frequency spectrum, and on a dedicated physical channel, on a shared physical channel, or in DCI. In some examples, the downlink subframes may be contiguous, the uplink subframes may be contiguous, and/or the uplink transmission period may directly follow the downlink transmission period.

At block 2220, the method 2200 may optionally include determining a beginning of the uplink transmission period based on at least one of the first indicator or the second indicator.

At block 2225, the method 2200 may include refraining from contending for access to the shared radio frequency spectrum during the uplink transmission period.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and components in FIGS. 13, 14, 16, and 17 may comprise processors, electronics devices, hardware devices, electronics components, logical circuits, memories, software codes, firmware codes, etc., or any combination thereof.

Those of skill would further appreciate that the various illustrative logical blocks, components, circuits, and algorithm steps described in connection with the disclosure herein may be implemented as electronic hardware, computer software, or combinations of both. To clearly illustrate this interchangeability of hardware and software, various illustrative components, blocks, components, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, components, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software component executed by a processor, or in a combination of the two. A software component may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving a provisional grant uplink (UL) assignment at a user equipment (UE), wherein the provisional grant UL assignment identifies uplink resources for UL transmission by the UE;
   performing a clear channel assessment (CCA) operation on a secondary component carrier (SCC) based on the provisional grant UL assignment, the SCC being a contention-based carrier;
   transmitting a schedule request (SR), after receiving the provisional grant UL assignment, on the SCC when the CCA operation succeeds;
   receiving a grant confirmation on the SCC in response to the SR; and
   transmitting data on the SCC after receiving the grant confirmation.

2. The method of claim 1, wherein the SR comprises a signature sequence and the grant confirmation comprises the same signature sequence.

3. The method of claim 1, wherein the grant confirmation is spaced from the CCA operation.

4. The method of claim 1, wherein the provisional grant UL assignment and the grant confirmation are received on a contention-based carrier.

5. The method of claim 1, wherein the provisional grant UL assignment is received on a non-contention carrier.

6. An apparatus for wireless communication, comprising:
   a memory; and
   at least one processor coupled to the memory and configured to:
   receive a provisional grant uplink (UL) assignment at a user equipment (UE), wherein the provisional grant UL assignment identifies uplink resources for UL transmission by the UE;
   perform a clear channel assessment (CCA) operation on a secondary component carrier (SCC) based on the provisional grant UL assignment, the SCC being a contention-based carrier;
   transmit a schedule request (SR), after receiving the provisional grant UL assignment, on the SCC when the CCA operation succeeds;
   receive a grant confirmation on the SCC in response to the SR; and
   transmit data on the SCC after receiving the grant confirmation.

7. The apparatus of claim 6, wherein the SR comprises a signature sequence and the grant confirmation comprises the same signature sequence.

8. The apparatus of claim 6, wherein the grant confirmation is spaced from the CCA operation.

9. The apparatus of claim 6, wherein the provisional grant UL assignment and the grant confirmation are received on a contention-based carrier.

10. The apparatus of claim 6, wherein the provisional grant UL assignment is received on a non-contention carrier.

11. A method of wireless communication, comprising:
transmitting a provisional grant uplink (UL) assignment to a set of user equipments (UEs), the set of UEs including one or more UE and the provisional grant UL assignment identifying uplink resources for UL transmission by the set of UEs;
detecting one or more schedule requests (SRs) on a secondary component carrier (SCC), the SCC being a contention-based carrier, in response to the provisional grant UL assignment; and
transmitting one or more grant confirmations on the SCC in response to the detected one or more SRs.

12. The method of claim 11, wherein each SR comprises a unique signature sequence, and
wherein each of the one or more grant confirmations comprise a signature sequence corresponding to a selected UE.

13. The method of claim 11, wherein the one or more grant confirmations are spaced from the SR.

14. The method of claim 11, wherein the provisional grant UL assignment and the one or more grant confirmations are transmitted on a contention-based carrier.

15. The method of claim 11, wherein the provisional grant UL assignment is transmitted on a non-contention carrier.

16. An apparatus for wireless communication, comprising:
a memory; and
at least one processor coupled to the memory and configured to:
transmit a provisional grant uplink (UL) assignment to a set of user equipments (UEs), the set of UEs including one or more UE and the provisional grant UL assignment identifying uplink resources for UL transmission by the set of UEs;
detect one or more schedule requests (SRs) on a secondary component carrier (SCC), the SCC being a contention-based carrier, in response to the provisional grant UL assignment; and
transmit one or more grant confirmations on the SCC in response to the detected one or more SRs.

17. The apparatus of claim 16, wherein each SR comprises a unique signature sequence, and
wherein each of the one or more grant confirmations comprises a signature sequence corresponding to a selected UE.

18. The apparatus of claim 16, wherein the one or more grant confirmations are spaced from the SR.

19. The apparatus of claim 16, wherein the provisional grant UL assignment and the one or more grant confirmations are transmitted on a contention-based carrier.

20. The apparatus of claim 16, wherein the provisional grant UL assignment is transmitted on a non-contention carrier.

* * * * *